US012660030B2

(12) United States Patent    (10) Patent No.:    US 12,660,030 B2
Goyal et al.    (45) Date of Patent:    Jun. 16, 2026

(54) TRANSMISSION CONFIGURATION INDICATOR (TCI) ACTIVATION

(71) Applicant: Nokia Technologies Oy, Espoo (FI)

(72) Inventors: Sanjay Goyal, Murray Hill, NJ (US); Riikka Karoliina Dimnik, Espoo (FI); Timo Koskela, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 19/242,429

(22) Filed: Jun. 18, 2025

(65) Prior Publication Data

US 2025/0317820 A1    Oct. 9, 2025

Related U.S. Application Data

(63) Continuation of application No. PCT/EP2024/072306, filed on Aug. 7, 2024.

(Continued)

(51) Int. Cl.
*H04W 76/20*    (2018.01)
*H04B 7/06*    (2006.01)
(Continued)

(52) U.S. Cl.
CPC ........ *H04W 76/20* (2018.02); *H04B 7/06968* (2023.05); *H04L 5/0051* (2013.01);
(Continued)

(58) Field of Classification Search
CPC ..... H04W 36/04; H04W 36/08; H04W 76/20; H04B 7/06968
See application file for complete search history.

(56) References Cited

U.S. PATENT DOCUMENTS

2021/0351834 A1*    11/2021    Yang ................... H04W 72/046
2023/0239032 A1*    7/2023    Yang ..................... H04L 5/0023
                                                                370/330
(Continued)

FOREIGN PATENT DOCUMENTS

WO        2022/126663 A1    6/2022
WO        2022/205309 A1    10/2022
(Continued)

OTHER PUBLICATIONS

"Revised WID on Further NR mobility enhancements", 3GPP TSG RAN Meeting #100, RP-231475, Agenda: 9.3.2.1, MediaTek Inc., Jun. 12-14, 2023, 5 pages.

(Continued)

*Primary Examiner* — Will W Lin
(74) *Attorney, Agent, or Firm* — ALSTON & BIRD LLP

(57)    ABSTRACT

A method includes receiving, by a user equipment (UE) connected to a first cell, an activation for a first transmission configuration indicator (TCI) state of a first configured TCI state pool associated with a second cell and further receiving a configuration of a second TCI state of a second TCI state pool associated with the second cell. The UE determines that the first activated TCI state and the second TCI state share one or more properties, and based upon the determining, activates the second TCI state of the second cell. The UE performs a cell switch to the second cell, maintaining the activated second TCI state of the second cell.

20 Claims, 11 Drawing Sheets

Related U.S. Application Data

(60) Provisional application No. 63/520,793, filed on Aug. 21, 2023.

(51) Int. Cl.

| | |
|---|---|
| *H04L 5/00* | (2006.01) |
| *H04W 16/28* | (2009.01) |
| *H04W 36/04* | (2009.01) |
| *H04W 36/08* | (2009.01) |

(52) U.S. Cl.
CPC ........... *H04W 16/28* (2013.01); *H04W 36/04* (2013.01); *H04W 36/08* (2013.01)

(56) References Cited

U.S. PATENT DOCUMENTS

| | | | | |
|---|---|---|---|---|
| 2024/0171353 | A1* | 5/2024 | Yang | H04B 7/00 |
| 2024/0267807 | A1* | 8/2024 | Peng | H04L 1/1812 |
| 2024/0414735 | A1* | 12/2024 | Yuan | H04W 72/1273 |
| 2025/0088922 | A1* | 3/2025 | Lin | H04W 36/0061 |
| 2025/0358696 | A1* | 11/2025 | Zhang | H04W 36/0055 |

FOREIGN PATENT DOCUMENTS

| | | |
|---|---|---|
| WO | 2023/276132 A1 | 1/2023 |
| WO | 2023/011188 A1 | 2/2023 |
| WO | 2023/248075 A1 | 12/2023 |
| WO | 2024/013665 A2 | 1/2024 |
| WO | 2024/056089 A1 | 3/2024 |
| WO | 2024/103521 A1 | 5/2024 |
| WO | 2024/207139 A1 | 10/2024 |
| WO | 2024/208465 A1 | 10/2024 |
| WO | 2024/234002 A2 | 11/2024 |
| WO | 2025/007332 A1 | 1/2025 |
| WO | 2025/010408 A1 | 1/2025 |
| WO | 2025/041561 A1 | 2/2025 |

OTHER PUBLICATIONS

"3rd Generation Partnership Project; Technical Specification Group Radio Access Network; NR; Requirements for support of radio resource management (Release 18)", 3GPP TS 38.133, V18.2.0, Jun. 2023, 5976 pages.

"3rd Generation Partnership Project; Technical Specification Group Radio Access Network; NR; Layer 2 Measurements; (Release 17)", 3GPP TS 38.314, V17.3.0, Jun. 2023, pp. 1-33.

"3rd Generation Partnership Project; Technical Specification Group Radio Access Network; NR; Radio Resource Control (RRC) protocol specification (Release 17)", 3GPP TS 38.331, V17.5.0, Jun. 2023, pp. 1-1328.

"3rd Generation Partnership Project; Technical Specification Group Radio Access Network; NR; Physical layer procedures for control (Release 17)", 3GPP TS 38.213, V17.6.0, Jun. 2023, pp. 1-262.

"Wi-Fi 6", Wikipedia, Retrieved on Jul. 9, 2025, Webpage available at : https://en.wikipedia.org/wiki/Wi-Fi_6.

"3rd Generation Partnership Project; Technical Specification Group Radio Access Network; NR; NR and NG-RAN Overall Description, Stage 2 (Release 16)", 3GPP TS 38.300, V16.6.0, Jun. 2021, pp. 1-152.

"3rd Generation Partnership Project, Technical Specification Group Radio Access Network; NR; Medium Access Control (MAC) protocol specification (Release 18)", 3GPP TS 38.321, V18.1.0, Mar. 2024, pp. 1-322.

International Search Report and Written Opinion received for corresponding Patent Cooperation Treaty Application No. PCT/EP2024/072306, dated Nov. 4, 2024, 15 pages.

"Layer-1 Enhancements for L1/L2-triggered Mobility", 3GPP TSG RAN WG1 #113, R1-2305156, Agenda: 9.10.1, Nokia, May 22-26, 2023, 15 pages.

"Discussion on L1 enhancements for inter-cell beam management", 3GPP TSG RAN WG1#114, R1-2306938, Agenda: 9.10.1, Lenovo, Aug. 21-25, 2023, 13 pages.

Examiner's tentative rejection received for corresponding Taiwan Patent Application No. 113130912, dated Apr. 30, 2025, 23 pages of Examiner's tentative rejection and 6 pages of translation available.

CATT, "Discussion on L1/L2 inter-cell mobility delay requirements", 3GPP TSG-RAN WG4 Meeting #106-bis-e, R4-2304411, (Apr. 17-26, 2023), 4 pages.

Ericsson, "On beam application time", 3GPP TSG RAN WG4 Meeting #108, R4-2313695, (Aug. 21-25, 2023), 6 pages.

Ericsson, "RRC running CR for LTM", 3GPP TSG-RAN WG2 Meeting #122, Draft Change Request, R2-2306015, (May 22-26, 2023), 74 pages.

Futurewei, "L1 Enhancements for Inter-cell Beam Management", 3GPP TSG RAN WG1 Meeting #114, R1-2306425, (Aug. 21-25, 2023), 9 pages.

Huawei et al., "L1 enhancements for inter-cell beam management", 3GPP TSG- RAN WG1 Meeting #114, R1-2306518, (Aug. 21-25, 2023).

MediaTek Inc et al., "38.300 running CR for introduction of NR further mobility enhancements", 3GPP TSG-RAN WG2 Meeting #123, Draft Change Request, R2-2308145, (Aug. 21-25, 2023), 12 pages.

OPPO, "Discussions on Inter-cell beam management enhancement", 3GPP TSG RAN WG1 #114, R1-2307526, (Aug. 21-25, 2023), 8 pages.

Qualcomm Incorporated, "L1 Enhancements for Inter-Cell Beam Management", 3GPP TSG RAN WG1 Meeting #114, R1-2307946, (Aug. 21-25, 2023), 6 pages.

Vivo, "Discussion on L1 enhancements for L1/L2 mobility", 3GPP TSG RAN WG1 #114, R1-2306767, (Aug. 21-25, 2023), 12 pages.

ZTE Corporation, "Discussion on L1/L2 inter-cell mobility delay requirements", 3GPP TSG-RAN WG4 Meeting #107, R4-2308411, (May 22-26, 2023), 4 pages.

"Msc-generator", Sourceforge, Retrieved on Sep. 18, 2024, Webpage available at :https://sourceforge.net/projects/msc-generator/.

Notice of Allowance for Taiwanese Application No. 113130912 dated Jan. 2, 2026, 3 pages.

* cited by examiner

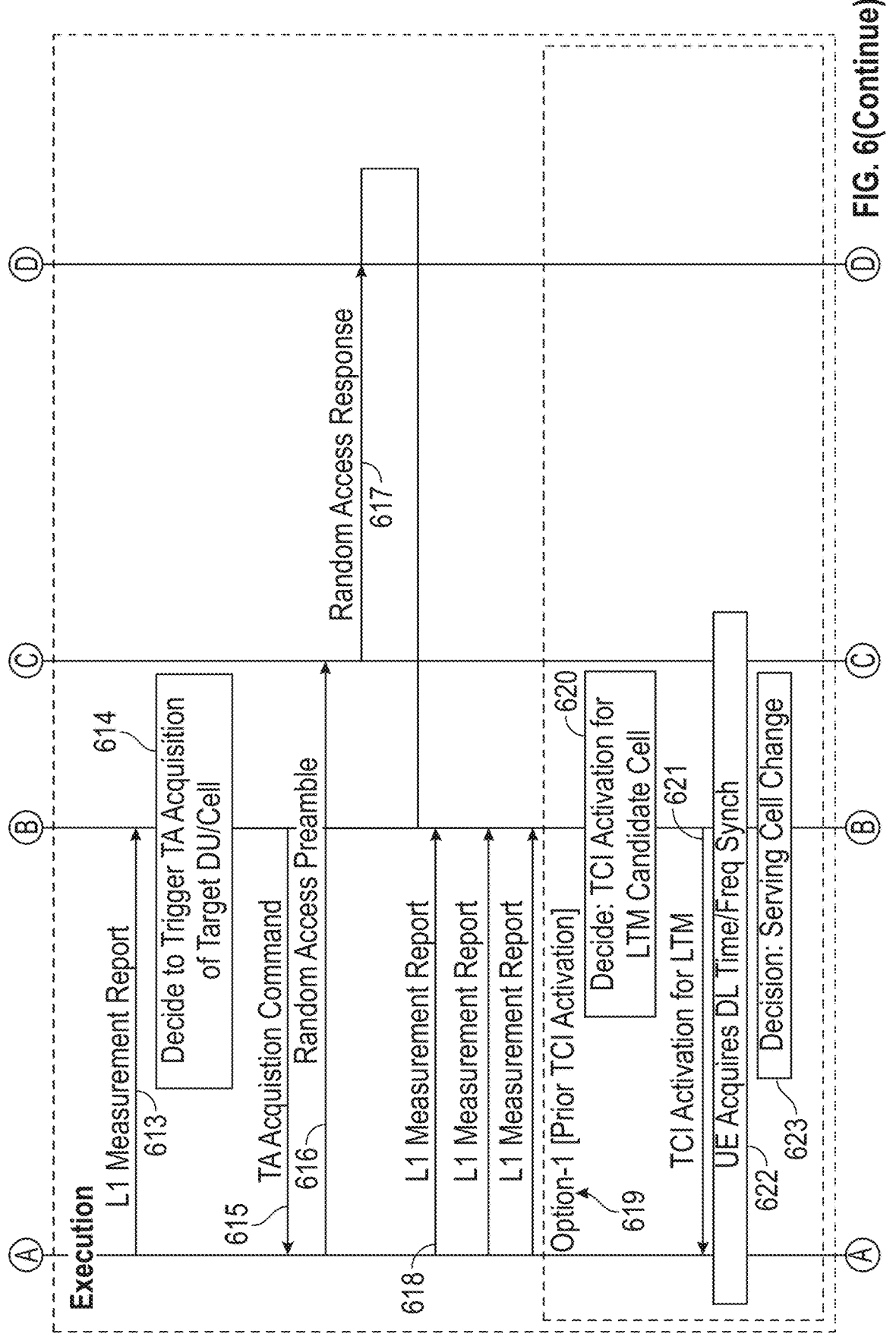
FIG. 6(Continue)

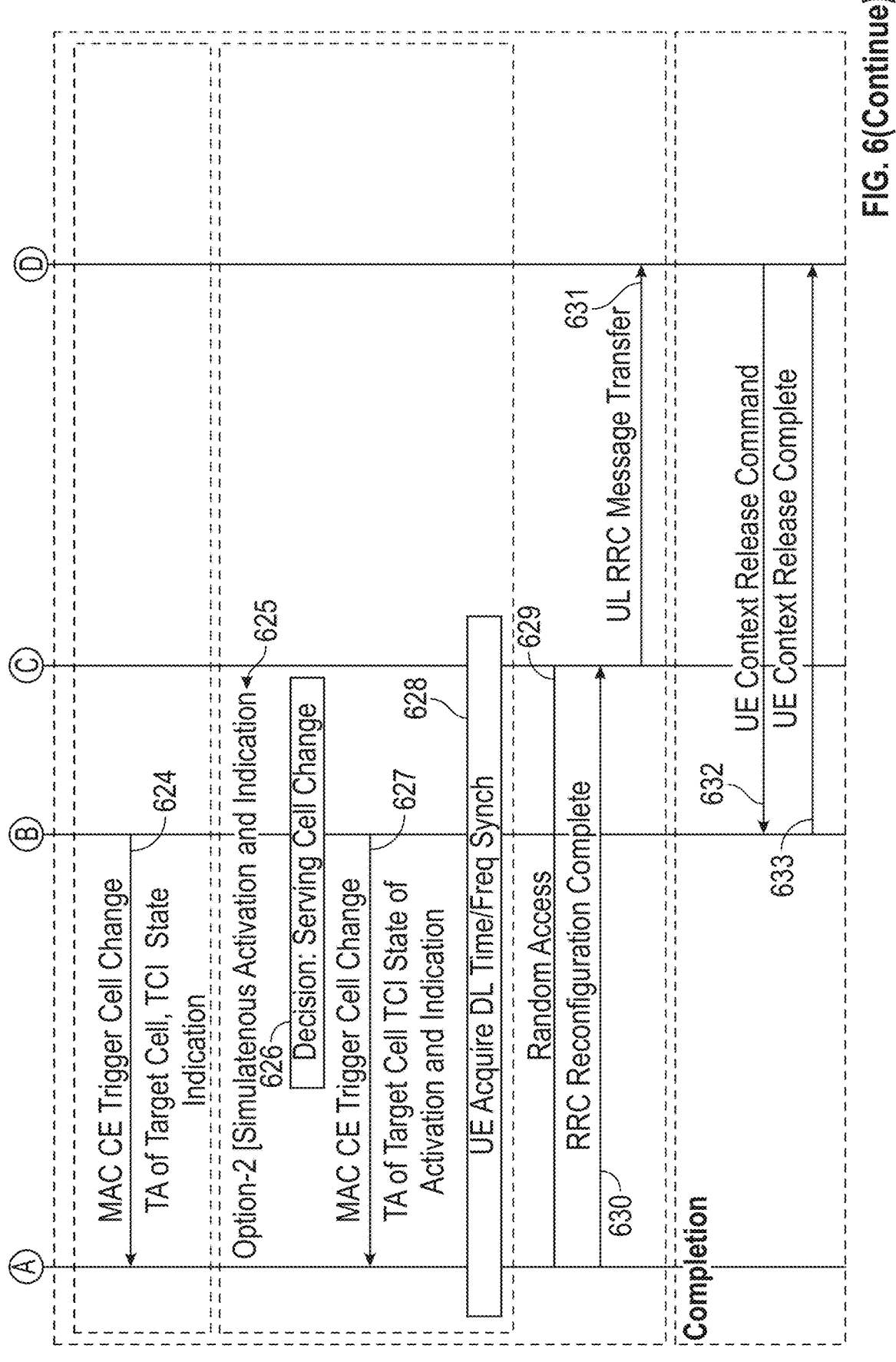
FIG. 6(Continue)

TRANSMISSION CONFIGURATION INDICATOR (TCI) ACTIVATION

FIELD

Various example embodiments relate generally to wireless networking and, more particularly, to transmission configuration indicator (TCI) states for mobility in wireless networking.

BACKGROUND

Wireless networking provides significant advantages for user mobility. A user's ability to remain connected while on the move provides advantages not only for the user, but also provides greater efficiency and productivity for society as a whole. As user expectations for connection reliability, data speed, and device battery life, become more demanding, technology for wireless networking must also keep pace with such expectations. Accordingly, there is continuing interest in improving wireless networking technology. For that purpose, the cellular standards have developed cell switching on various protocol layers: conventional Layer 3 handovers have been present for several generations. On top of that, a conditional handover was introduced to improve the reliability of handovers. Recent development has contemplated lower-layer handovers known as Layer1/Layer 2 triggered mobility (LTM). Efforts to reduce latency during handovers may therefore be valuable.

SUMMARY

In an aspect of the present disclosure, a method includes receiving, by a user equipment (UE) connected to a first cell, an activation for a first transmission configuration indicator (TCI) state of a first configured TCI state pool associated with a second cell and further receiving a configuration of a second TCI state of a second TCI state pool associated with the second cell. The UE determines that the first activated TCI state and the second TCI state share one or more properties, and based upon the determining, activates the second TCI state of the second cell. The UE performs a cell switch to the second cell, maintaining the activated second TCI state of the second cell.

In an aspect of the method, the UE maintains the activated second TCI state of the second cell upon switching to the second cell.

In an aspect of the method, the activation of the second TCI state of the second cell is determined after switching to the second cell.

In an aspect of the method, the activation of the second TCI state of the second cell is determined after reception of a cell switch command that switches The UE to the second cell.

In an aspect of the method, the activation of the second TCI state of the second cell is determined after reception and acknowledging of the cell switch command that switches the UE to the second cell.

In an aspect of the method, the activation of the second TCI state of the second cell is determined after processing of the cell switch command that switches the UE to the second cell.

In an aspect of the method, the first activated TCI state of the first TCI state pool is associated with a beam management configuration for the second cell and the second TCI state of the second TCI state pool is associated with a lower-layer triggered mobility (LTM) configuration for the second cell.

In an aspect of the method, the first activated TCI state of the first TCI state pool is associated with a lower-layer triggered mobility (LTM) configuration for the second cell and the second TCI state of the second TCI state pool is associated with a beam management configuration for the second cell.

In an aspect of the method, the second cell is configured as an LTM candidate cell.

In an aspect of the method, the second cell is configured as a serving cell.

In an aspect of the method, the determination of the first activated TCI state and the second TCI sharing one or more properties includes determining that a quasi-colocation (QCL) reference signal of the first activated TCI state is equivalent to the QCL reference signal of the second TCI state.

In an aspect of the method, the determination of the first activated TCI state and the second TCI sharing one or more properties includes determining that a quasi-colocation (QCL) reference signal of the first activated TCI state shares one or more properties with the QCL reference signal of the second TCI state.

In an aspect of the method, the one or more QCL properties include one or more of the following: doppler spread, doppler shift, delay spread, or average delay.

In an aspect of the method, the QCL reference signal of the first activated TCI state sharing one or more properties with the QCL reference signal of the second TCI state includes the QCL reference signal of the first activated TCI state including a same QCL source reference signal (RS).

In an aspect of the method, the activation for the first TCI state of the first TCI state pool associated with a second cell and the second TCI state of the second TCI state pool associated with the second cell is included in a media access control (MAC) control element (CE) message.

In an aspect of the present disclosure, a user equipment (UE) includes at least one processor, and at least one memory storing instructions which, when executed by the at least one processor, cause the apparatus at least to perform any of the foregoing methods.

In an aspect of the present disclosure, a processor-readable medium storing instructions which, when executed by at least one processor of an apparatus, causes the apparatus at least to perform any of the foregoing methods.

In an aspect of the present disclosure, a method includes transmitting, by a first cell, a first message to a user equipment (UE) that includes at least a first activated transmission configuration indicator (TCI) state of a first TCI state pool associated with a second cell and a second TCI state of a second TCI state pool associated with the second cell, based upon the first activated TCI state and the second TCI state sharing one or more properties. The first cell performs beam management using the first TCI state, and transmits, to a user equipment, an instruction for a lower-layer triggered mobility (LTM) cell switch to the second cell, the instruction including the second TCI state for the second cell.

In an aspect of the method, the instruction for the LTM cell switch includes a command for LTM cell switch to the second cell.

In an aspect of the method, a determination of the first activated TCI state and the second TCI state sharing one or more properties includes determining that a quasi-colocation (QCL) reference signal of the first activated TCI state is equivalent to the QCL reference signal of the second TCI state.

In an aspect of the method, a determination of the first activated TCI state and the second TCI sharing one or more properties includes determining that a quasi-colocation (QCL) reference signal of the first activated TCI state shares one or more properties with the QCL reference signal of the second TCI state.

In an aspect of the method, the one or more QCL properties include one or more of the following: doppler spread, doppler shift, delay spread, or average delay.

In an aspect of the method, the QCL reference signal of the first activated TCI state sharing one or more properties with the QCL reference signal of the second TCI state includes the QCL reference signal of the first activated TCI state including a same QCL source reference signal (RS).

In an aspect of the method, the first activated TCI state of the first TCI state pool is associated with a lower-layer triggered mobility (LTM) configuration for the second cell and the second TCI state of the second TCI state pool is associated with a beam management configuration for the second cell.

In an aspect of the method, the second cell is configured as an LTM candidate cell.

In an aspect of the method, the second cell is configured as a serving cell.

In an aspect of the method, the first message is a media access control (MAC) control element (CE) message.

In an aspect of the present disclosure, an apparatus includes at least one processor, and at least one memory storing instructions which, when executed by the at least one processor, cause the apparatus at least to perform any of the foregoing methods.

In an aspect of the present disclosure, a processor-readable medium storing instructions which, when executed by at least one processor of an apparatus, causes the apparatus at least to perform any of the foregoing methods.

According to some aspects, there is provided the subject matter of the independent claims. Some further aspects are defined in the dependent claims.

BRIEF DESCRIPTION OF THE DRAWINGS

Some example embodiments will now be described with reference to the accompanying drawings.

DETAILED DESCRIPTION

Figure 1:
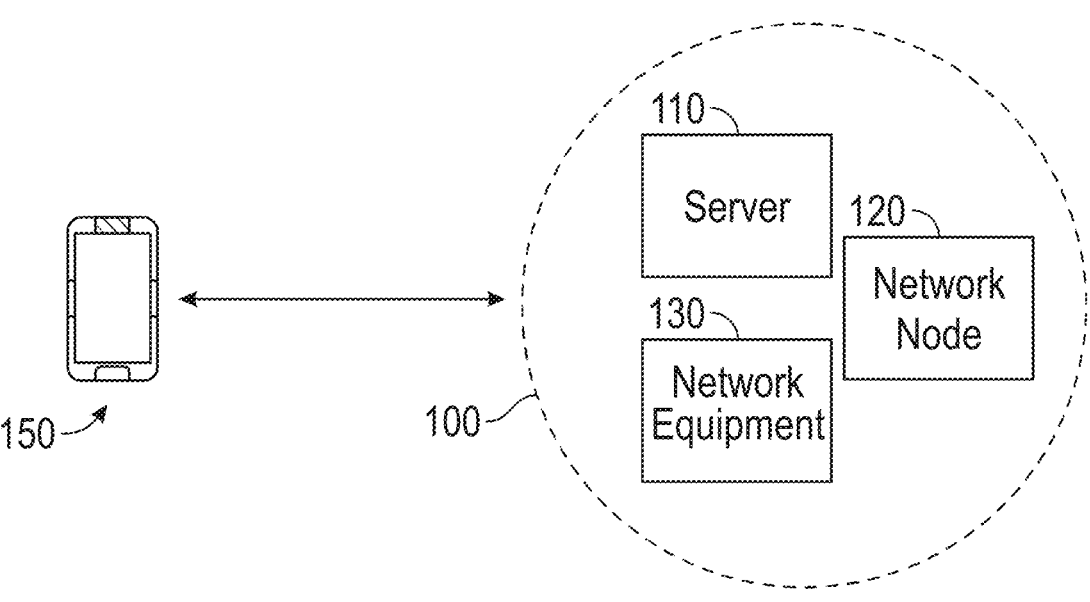
FIG. 1 is a diagram of an example embodiment of wireless networking between a network system and a user equipment apparatus (UE), according to one illustrated aspect of the disclosure.

In the following description, certain specific details are set forth in order to provide a thorough understanding of disclosed aspects. However, one skilled in the relevant art will recognize that aspects may be practiced without one or more of these specific details or with other methods, components, materials, etc. In other instances, well-known structures associated with transmitters, receivers, or transceivers have not been shown or described in detail to avoid unnecessarily obscuring descriptions of the aspects.

Reference throughout this specification to "one aspect" or "an aspect" means that a particular feature, structure, or characteristic described in connection with the aspect is included in at least one aspect. Thus, the appearances of the phrases "in one aspect" or "in an aspect" in various places throughout this specification are not necessarily all referring to the same aspect. Furthermore, the particular features, structures, or characteristics may be combined in any suitable manner in one or more aspects.

Embodiments described in the present disclosure may be implemented in wireless networking apparatuses, such as, without limitation, apparatuses utilizing Worldwide Interoperability for Microwave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, enhanced LTE (eLTE), 5G New Radio (5G NR), 5G Advance, 6G (and beyond) and 802.11ax (Wi-Fi 6), among other wireless networking systems. The term 'eLTE' here denotes the LTE evolution that connects to a 5G core. LTE is also known as evolved UMTS terrestrial radio access (EUTRA) or as evolved UMTS terrestrial radio access network (EUTRAN).

Because a UE may travel from one area to another area, handover or mobility procedures can be important to support continued communication (without any interruption or at least a minimal interruption) of the UE with the network. In an example, the UE may be configured to monitor certain reference signal(s) (e.g., SSBs, channel state information-reference signals (CSI-RSs), DL reference signals (RSs)) from one or more network apparatuses, perform signal measurements of the reference signal(s), and report those signal measurements to the network so that a determination of a handover of the UE to a neighboring cell can be made (e.g., upon a degradation in signal quality is detected). The initiation of a handover may typically be made from the network. In an example of 5G NR, a handover initiation or handover command may be signaled via higher layer signaling, e.g., layer 3 or radio resource control (RRC) signaling. The higher layer signaling may involve the network, and thus can have a high latency. In various situations, a UE may benefit from a more efficient handover procedure triggered via lower layer signaling, e.g., L1/L2 signaling, that has a lower latency than the higher layer signaling. As used herein, a handover triggered via lower layer signaling may be referred to as lower layer triggered mobility (LTM). In some instances, a candidate cell for LTM may be referred to as an LTM candidate cell.

As used herein, the term "cell switch" means and refers to any change of cell, whether the change is triggered via Layer 1 signaling, Layer 2 signaling, and/or Layer 3 signaling, and/or other signaling. The cell switch may be for a terminal device in a RRC connected mode and, thus, the cell switch may involve bidirectional signaling between the terminal device and at least one network node of a radio access network, typically at least a source network node and a target network node of the cell switch. The present disclosure primarily uses LTM as an example of cell switch, but it is intended and shall be understood that the present disclosure may operate with a Layer 3 handover or any cell switch.

The present disclosure may use the term "serving cell" to refer to a network node or network apparatus (or a portion thereof) that services a UE, may use the term "candidate cell" to refer to a network node or network apparatus (or portion thereof) that is a potential target of a cell switch command, and may use the term "target cell" to refer to a network node or a network apparatus (or portion thereof) that is the target of a cell switch command. In some examples, the LTM target may also be a serving cell (e.g., the target is may be an "SCell," i.e., a secondary cell in carrier aggregation).

As used herein, the terms "transmit towards," "receive from," and "cooperate with," (and their variations) include communications that may or may not involve communications through one or more intermediate devices or nodes. The term "acquire" (and its variations) includes acquiring in the first instance or reacquiring after the first instance. The term "connection" may mean a physical connection or a logical connection.

FIG. 1 is a diagram depicting an example of wireless networking between a network system 100 and a user equipment apparatus (UE) 150. The network system 100 may include one or more network nodes 120, one or more servers 110, and/or one or more network equipment 130 (e.g., test equipment). The network nodes 120 will be described in more detail below. As used herein, the term "network apparatus" may refer to any component of the network system 100, such as the server 110, the network node 120, the network equipment 130, any component(s) of the foregoing, and/or any other component(s) of the network system 100. Examples of network apparatuses include, without limitation, apparatuses implementing aspects of 5G NR, among others. The present disclosure describes embodiments related to 5G NR and embodiments that involve aspects defined by 3rd Generation Partnership Project (3GPP). However, it is contemplated that embodiments relating to other wireless networking technologies are encompassed within the scope of the present disclosure.

The following description provides further details of examples of network nodes. In a 5G NR network, a gNodeB (also known as gNB) may include, e.g., a node that provides NR user plane and control plane protocol terminations towards the UE and that is connected via a NG interface to the 5G core (5GC), e.g., according to 3GPP TS 38.300 V16.6.0 (2021-06) section 3.2, which is hereby incorporated by reference herein.

A gNB supports various protocol layers, e.g., Layer 1 (L1)—physical layer, Layer 2 (L2), and Layer 3 (L3).

The layer 2 (L2) of NR is split into the following sublayers: Medium Access Control (MAC), Radio Link Control (RLC), Packet Data Convergence Protocol (PDCP) and Service Data Adaptation Protocol (SDAP), where, e.g.:

The physical layer offers to the MAC sublayer transport channels;

The MAC sublayer offers to the RLC sublayer logical channels;

The RLC sublayer offers to the PDCP sublayer RLC channels;

The PDCP sublayer offers to the SDAP sublayer radio bearers;

The SDAP sublayer offers to 5GC quality of service (QOS) flows;

Control channels include broadcast control channel (BCCH) and physical control channel (PCCH).

Layer 3 (L3) includes, e.g., radio resource control (RRC), e.g., according to 3GPP TS 38.300 V16.6.0 (2021-06) section 6, which is hereby incorporated by reference herein.

A gNB central unit (gNB-CU) includes, e.g., a logical node hosting, e.g., radio resource control (RRC), service data adaptation protocol (SDAP), and packet data convergence protocol (PDCP) protocols of the gNB or RRC and PDCP protocols of the en-gNB, that controls the operation of one or more gNB distributed units (gNB-DUs). The gNB-CU terminates the F1 interface connected with the gNB-DU. A gNB-CU may also be referred to herein as a CU, a central unit, a centralized unit, or a control unit.

A gNB Distributed Unit (gNB-DU) includes, e.g., a logical node hosting, e.g., radio link control (RLC), media access control (MAC), and physical (PHY) layers of the gNB or en-gNB, and its operation is partly controlled by the gNB-CU. One gNB-DU supports one or multiple cells. One cell is supported by only one gNB-DU. The gNB-DU terminates the F1 interface connected with the gNB-CU. A gNB-DU may also be referred to herein as DU or a distributed unit.

As used herein, the term "network node" may refer to any of a gNB, a gNB-CU, or a gNB-DU, or any combination of them. A RAN (radio access network) node or network node such as, e.g., a gNB, gNB-CU, or gNB-DU, or parts thereof, may be implemented using, e.g., an apparatus with at least one processor and/or at least one memory with processor-readable instructions ("program") configured to support and/or provision and/or process CU and/or DU related functionality and/or features, and/or at least one protocol (sub-) layer of a RAN (radio access network), e.g., layer 2 and/or layer 3. Different functional splits between the central and distributed unit are possible. An example of such an apparatus and components will be described in connection with FIG. 12 below.

The gNB-CU and gNB-DU parts may, e.g., be co-located or physically separated. The gNB-DU may even be split further, e.g., into two parts, e.g., one including processing equipment and one including an antenna. A central unit (CU) may also be called BBU/REC/RCC/C-RAN/V-RAN, O-RAN, or part thereof. A distributed unit (DU) may also be called RRH/RRU/RE/RU, or part thereof. Hereinafter, in various example embodiments of the present disclosure, a network node, which supports at least one of central unit functionality or a layer 3 protocol of a radio access network, may be, e.g., a gNB-CU. Similarly, a network node, which supports at least one of distributed unit functionality or a layer 2 protocol of the radio access network, may be, e.g., a gNB-DU.

A gNB-CU may support one or multiple gNB-DUs. A gNB-DU may support one or multiple cells and, thus, could support a serving cell for a user equipment apparatus (UE) or support a candidate cell for handover, dual connectivity, and/or carrier aggregation, among other procedures.

The user equipment apparatus (UE) 150 may be or include a wireless or mobile device, an apparatus with a radio interface to interact with a RAN (radio access network), a smartphone, an in-vehicle apparatus, an IoT device, or a M2M device, among other types of user equipment. Such UE 150 may include: at least one processor; and at least one memory including program code; where the at least one memory and the computer program code are configured to, with the at least one processor, cause the apparatus at least to perform certain operations, such as, e.g., RRC connection to the RAN. An example of components of a UE will be described in connection with FIG. 12. In embodiments, the UE 150 may be configured to generate a message (e.g., including a cell ID) to be transmitted via radio towards a RAN (e.g., to reach and communicate with a serving cell). In embodiments, the UE 150 may generate and transmit and receive RRC messages containing one or more RRC PDUs (packet data units). Persons skilled in the art will understand RRC protocol as well as other procedures a UE may perform.

With continuing reference to FIG. 1, in the example of a 5G NR network, the network system 100 provides one or more cells, which define a coverage area of the network system 100. As described above, the network system 100 may include a gNB of a 5G NR network or may include any other apparatus configured to control radio communication and manage radio resources within a cell. As used herein, the term "resource" may refer to radio resources, such as a resource block (RB), a physical resource block (PRB), a radio frame, a subframe, a time slot, a sub-band, a frequency region, a sub-carrier, a beam, etc. In embodiments, the network node 120 may be called a base station.

FIG. 1 provides an example and is merely illustrative of a network system 100 and a UE 150. Persons skilled in the art will understand that the network system 100 includes components not illustrated in FIG. 1 and will understand that other user equipment apparatuses may be in communication with the network system 100.

Figure 2:
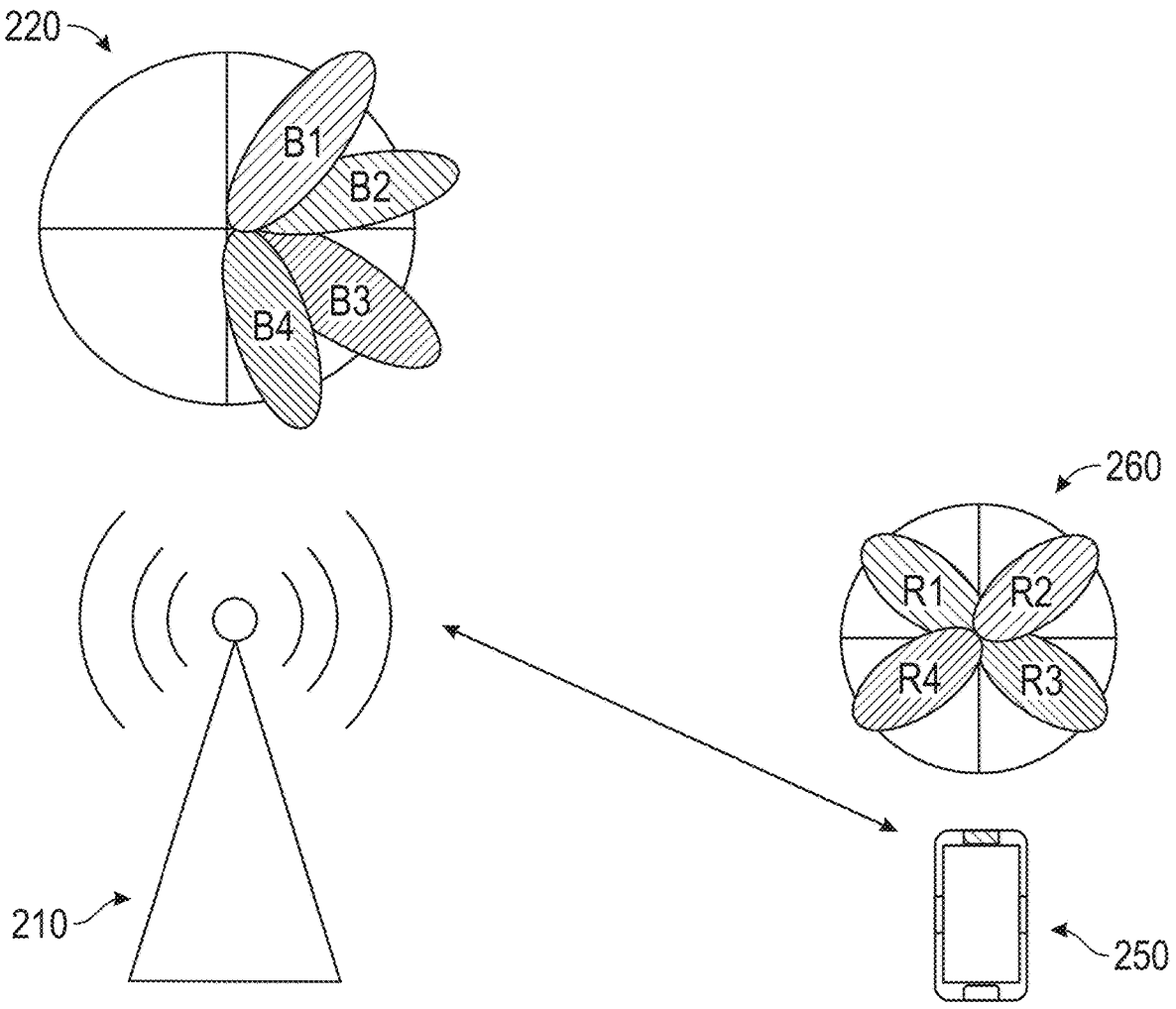
FIG. 2 is a diagram of an example embodiment of transmit and receive beams for wireless networking between a network apparatus and a user equipment apparatus (UE), according to one illustrated aspect of the present disclosure.

FIG. 2 is a diagram of an example embodiment of wireless networking between a network apparatus 210 and a user equipment apparatus (UE) 150. The network apparatus 210 is configured to form beams 220 in multiple directions, and the UE 150 is also configured to form beams 260 in multiple directions. As persons skilled in the art will understand, the capability to beamform in multiple directions may be implemented using arrangements of multiple radiating elements, which may also be referred to as "arrays" of radiating elements. Beamforming (also known as spatial filtering) achieves directional signal transmission or reception by utilizing separate arrays and/or by combining elements in an array in such a way that signals at particular angles result in constructive or destructive interference. Beamforming for a transmission is implemented by controlling the phase and relative amplitude of the transmission signal at each radiating element in an array, in order to create a desired pattern of constructive and destructive interference in a desired wavefront. Beamforming for a reception, in contrast, is implemented by combining information from different elements of an array in such a way that radiation in a target spatial region is preferentially observed.

In the illustrated example, the network apparatus 210 (e.g., gNodeB or part thereof) and the UE 150 may each be equipped with one or more antenna panels or antenna arrays with antenna elements that can be configured to perform beamforming in certain spatial directions and/or within certain spatial angular sectors or widths.

With continuing reference to FIG. 1, various examples of beams 220 are illustrated for the network apparatus 210 and various examples of beams 260 are illustrated for the UE 150. A consequence of using highly directive beams is that some of the network apparatus beams 120 may not be usable with some of the UE beams 160 due to large directional differences. Thus, in embodiments, the UE 150 "sweeps" its beams 260 and the network apparatus 210 "sweeps" its beams 220 to determine which beam-pairing has the highest signal power and, therefore, is best usable for communications. It is possible for beams that are not fully directionally-aligned to have the highest signal power due to various propagating conditions. The sweeps will be described in more detail in connection with FIG. 3. After identifying such a beam pairing, the UE 150 and the network apparatus 210 may use the identified beams to initiate access procedures for the UE 150 to access the network apparatus 210.

Figure 3:
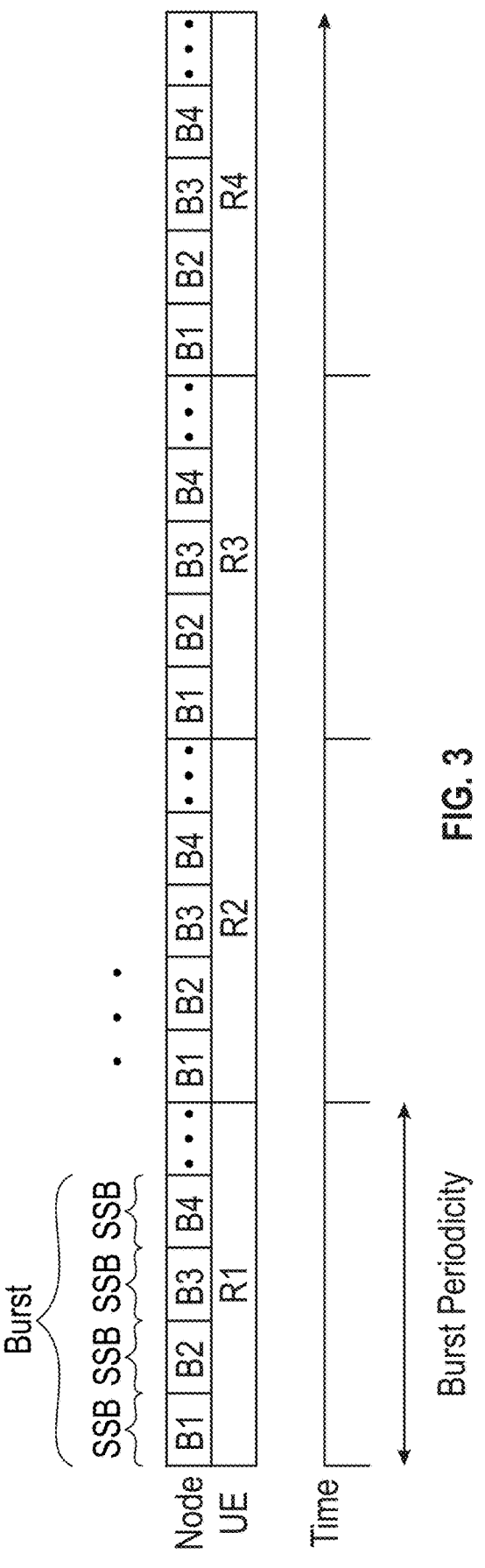
FIG. 3 is a diagram of an example embodiment of a UE sweeping receive beams for synchronization signal block (SSB) bursts, according to one illustrated aspect of the disclosure.

FIG. 3 is a diagram of an example embodiment of a UE sweeping receive beams for SSB bursts. Using the example beams illustrated in FIG. 2, the network apparatus 210 form beams B1, B2, B3, and B4, successively. Each formation of the beams is referred to as a "burst." The network apparatus 210 may generate the bursts at intervals for the UE 150 to observe. Each time between intervals is referred to as "burst period," which may be longer than the duration of a burst.

In the example of 5G NR, each beam in a burst transmits information about the beam in what is referred to as a signal synchronization block (SSB). A network apparatus 210, which may be a gNodeB, or part thereof, transmits an SSB in each beam in a burst. In some examples, the network apparatus 210 may operate using one SSB (single beam operation) or using multiple SSBs (multi beam operation). In embodiments, the UE 150 may receive a SSB burst for each of its receive beams. In the example of four receive beams R1, R2, R3, and R4, shown in FIG. 2, receiving the bursts for all four receive beams takes four intervals, as shown in FIG. 3. In some examples, the UE 150 may operate using a single beam (e.g., omnidirectional beam). The SSBs of an SS burst can be provided by one or more (co- or non co-located) TRP(s) (transmit-receive points). The duration between bursts is referred to as "burst periodicity." In a 5G NR network, SSB bursts can each last 5 ms, and burst periodicity can have a default duration of 20 ms.

In the example of 5G NR, each SSB includes System Information (SI) in the form of Master Information Blocks (MIB) and a number of System Information Blocks (SIB). The SI is divided into Minimum SI and Other SI. Minimum SI includes basic information usable for accessing the network node and information for acquiring any other SI. Minimum SI includes the MIB, which contains cell-barred status information and physical layer information of the cell for receiving further system information (e.g., CORESET #0 configuration). MIB is periodically broadcast on a broadcast channel (BCH). Minimum SI also includes a System Information Block 1 (SIB1), which defines the scheduling of other system information blocks and contains information for accessing the network node. SIB1 may also be referred to as Remaining Minimum SI (RMSI) and is periodically broadcast on a downlink shared channel (DL-SCH).

Referring also to FIG. 2, in an example of the 5th generation new radio (5G NR) as defined by 3rd Generation Partnership Project (3GPP), a unified transmission configuration indicator (TCI) framework is used for beam configurations and/or indications. For instance, the network apparatus 210 may configure the UE 150 with a set of TCI states.

Each TCI state may indicate at least a certain beam direction or a group of beam directions, which may correspond to a certain reference signal. In an example, a TCI state can be a downlink (DL) TCI state for DL communication from the network apparatus 210 to the UE 150. In other examples, a TCI state can be an uplink (UL) TCI state for UL communication from the UE 150 to the network apparatus 210. In a further example, a TCI state can be a joint TCI state for UL and DL communications between the network apparatus 210 and the UE 150. The network apparatus 210 may "activate" the UE with at least a subset of the configured TCI states. As used herein, "activating" a TCI state means that a UE 150 may monitor signals transmitted by the network apparatus 210 corresponding to the TCI state, such as reference signals. In examples, activation of a TCI State may mean that the UE is configured monitor at least one reference signal associated with the activated TCI State, e.g., for time/frequency tracking and/or path loss measurement. In examples, activation may mean that a UE 150 is expected to track at least one reference signal corresponding to the activated TCI state. In some examples, the network apparatus 210 may activate one or more of the configured TCI states in the set and exclude one or more of the other configured TCI states in the set. Additionally, to communicate with the UE 150, the network apparatus 210 may select one of the activated TCI states and "indicate" the selected TCI state to the UE 150. As used herein, "indicating" a TCI state means that a UE 150 may be configured to use the beam (identified by downlink reference signals) corresponding to the indicated TCI state to communicate with the network apparatus 210. In various examples, the UE 150 may be prepared to receive indication of at least one of the activated TCI state(s) and prepared to communicate with the network apparatus 210 using the indicated TCI state within specified time limits.

The examples of FIGS. 2 and 3 are merely illustrative. In embodiments, the number and direction of network node beams and the number and direction of UE beams may vary and may be different from those illustrated in FIGS. 2 and 3.

As explained above, a UE may travel from one area to another area, and thus cell switch or mobility procedures (e.g., layer 3 handover or LTM) can be important to support continued communication of the UE with the network. Further, a more efficient cell switch process, such as LTM, can be beneficial in avoiding or at least reducing disruption to the UE service as the UE moves from one cell coverage to another cell coverage.

Figure 4:
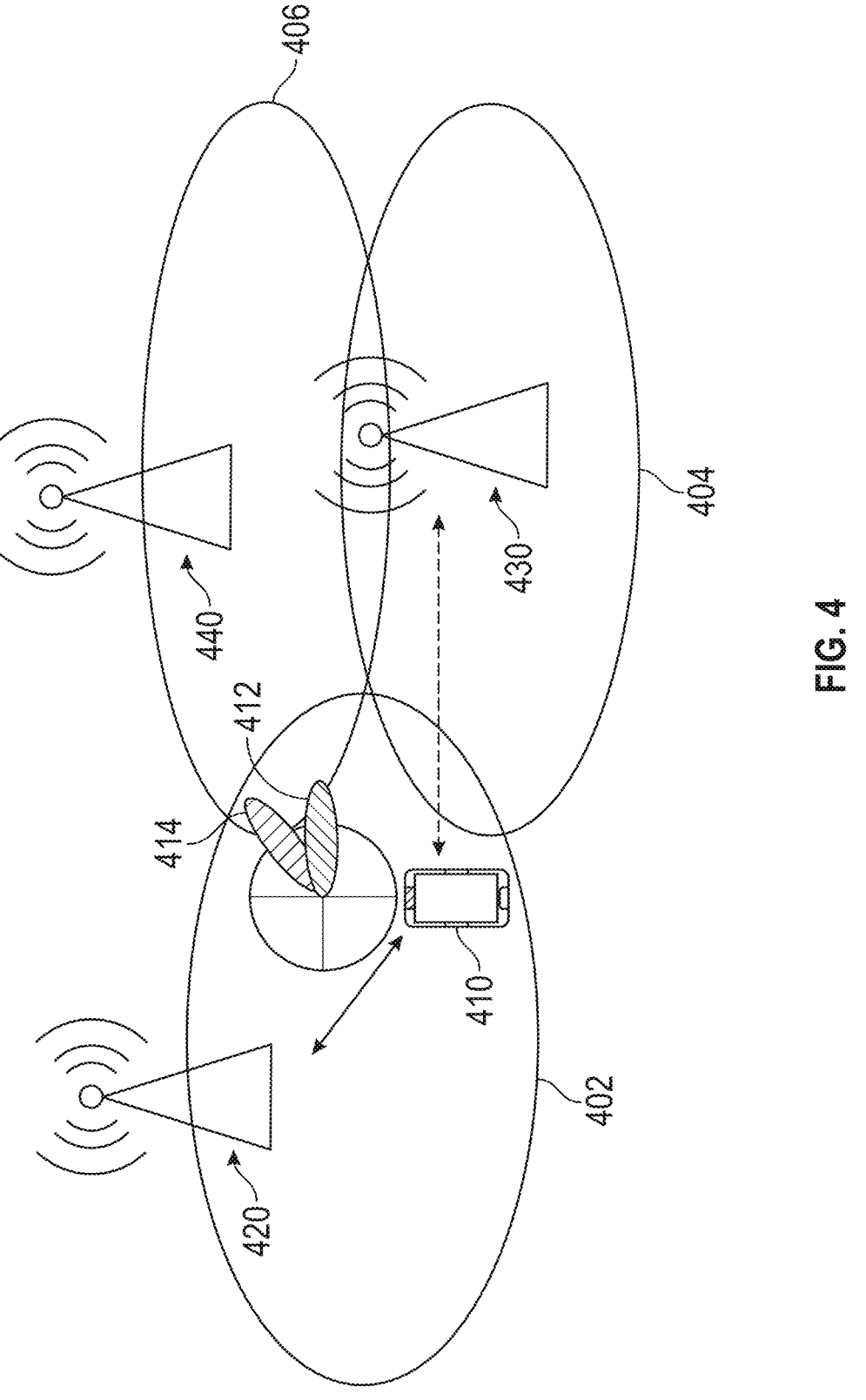
FIG. 4 is a diagram of an example embodiment of a layer 1/layer 2 triggered mobility (LTM) scenario, according to one illustrated aspect of the present disclosure.

FIG. 4 is a diagram of an example embodiment of an LTM scenario. As shown in FIG. 4, a UE 410 may be in communication with and served by a network apparatus 420 (e.g., a gNB, or a portion thereof) as indicated by the solid arrow. The UE 410 may be substantially similar to the UE 150 of FIG. 1. The network apparatus 420 may be substantially similar to the network apparatus 110 of FIG. 1. The network apparatus 420 that is actively or currently serving the UE 410 may be referred to as a serving cell. As the UE 410 travels towards an edge of a cell or area 402 served by (or under the coverage) of the network apparatus 420, a cell switch procedure may be performed to handover the UE 410 to a neighboring cell served by, e.g., another network apparatus 430, 440. In the illustrated example of FIG. 4, one neighboring cell is served by a network apparatus 430 and another neighboring cell is served by a network apparatus 440. The network apparatus 440 may cover (or serve) a cell or area 406 while the network apparatus 430 may cover an area 404. In some examples, the areas 402, 404, and 406 can partially overlap, as shown. In other examples, the areas 402, 404, and 406 can be non-overlapping. In the context of handover, the neighboring cells can be referred to as candidate cells. In the context of LTM, the neighboring cells can be referred to as LTM candidate cells.

The term Layer 1/Layer 2 triggered mobility (LTM) may also be referred to as L1/L2 triggered mobility, L1/L2 inter-cell mobility, L1/L2 handover, or lower layer (L1/L2) mobility. These terms may be used interchangeably. A L1/L2 signal, message, or command sent by a network node to trigger a cell switch at the UE is referred as a "cell switch command." In LTM, the decision about a cell switch is based on L1 measurements and is made in the MAC layer in a distributed unit (DU). A cell switch command includes a MAC control element (MAC CE). The cell that is the target of a cell switch command may be referred to herein as a target cell. Mechanisms for LTM will be discussed more fully below with reference to FIGS. 7-11.

According to an aspect of the present disclosure, the network apparatus 420 (the serving cell) may activate the UE 410 with TCI state(s) for candidate cell(s) and may optionally indicate an activated TCI state that may be used by the UE 410 in case of a cell switch. In this regard, the network apparatus 420 may transmit an indication of one or more candidate cells (e.g., the network apparatuses 430 and 440) and an activation of a respective list of one or more TCI states for each of the one or more candidate cell. Upon detection of degradation in operations or communications with the UE 410, the serving cell network apparatus 420 may transmit a cell switch command to the UE 410 via lower layer signaling (e.g., L1/L2 signaling). The cell switch command may indicate a selected one of the one or more candidate cells as a target cell for the cell switch. In response to receiving the cell switch command, the UE 410 may switch to communicate with the target cell by applying at least one of the respective one or more activated TCI states.

The example of FIG. 4 is merely illustrative. In embodiments, the number of candidate cells and the number of activated TCI states (or beams) may vary and may be different from those illustrated in FIG. 4.

A procedure for a UE to establish communications with a target cell is referred to as random access procedure. Random access procedure may be used for initial access, small data transmissions in inactive and transition from RRC_Inactive to RRC_Connected, as well as in beam failure recovery, connection re-establishment, handover, and cell addition, among other procedures which persons skilled in the art will recognize.

Figure 5:
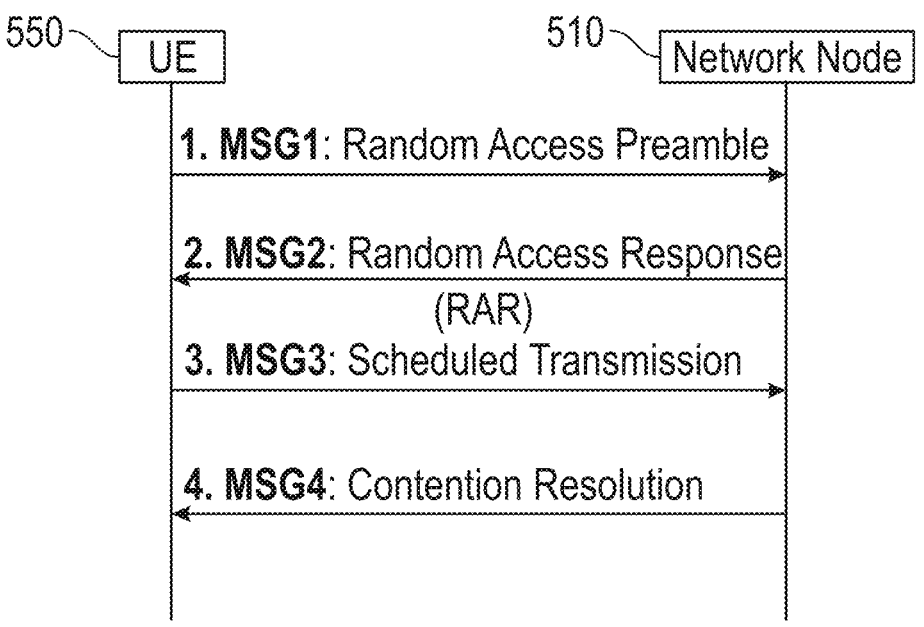
FIG. 5 is a diagram of an example embodiment of a contention-based random access procedure, according to one illustrated aspect of the disclosure.

Two types of random access procedures include contention-based random access (CBRA) and contention-free random access (CFRA). FIG. 5 is a diagram of an example of a contention-based random access (CBRA) procedure. In the illustrated example, the signals include a random access preamble (MSG1) transmitted by the UE 550 towards the network node 510 (e.g., gNodeB, or part thereof), a random access response (MSG2) transmitted from the network node 510 towards the UE 550, a schedule transmission (MSG3) transmitted from the UE 550 towards the network node 510, and a contention resolution (MSG4) transmitted from the network node 510 towards the UE 550.

For MSG1, the UE 550 selects a usable random access preamble based on information elements in a signal synchronization block (SSB), such as the SSB described above in connection with FIG. 3. The UE 550 sends the random access preamble (MSG1) towards the network node 510 using a specific time and frequency resource known as random access occasion (RO). The UE 550 also provides an identity, called random access radio network temporary identity (RA-RNTI), to the network so that the network can address it in the next step.

For MSG2, the network node 110 detects the preamble, calculates various quantities, and sends a physical uplink shared channel (PUSCH) uplink (UL) grant towards the UE 550. This is called the random access response (RAR), which is sent as MSG2 addressed to the UE 550 with the relevant RA-RNTI and indicates to the UE 550 where in frequency and when in time it can transmit MSG3 on the PUSCH.

For MSG3, in response to receiving the MSG2 from the network node 510, the UE 550 sends MSG3 using the UL grant provided in the RAR. Because the RAR provides a time resource allocation, the UE 550 sends MSG3 towards the network node 510 at a timing specified by the time resource allocation and is a scheduled transmission. This MSG3 may be called a radio resource control (RRC) connection request message.

For MSG4, the network node 510 may send MSG4 towards the UE 550 for contention resolution. Contention resolution may operate in the manner specified by 3GPP for 5G NR. After the random access procedure, assuming contention resolution is resolved favorably, the UE 550 becomes connected to the network node 510. After establishing a connection, various procedures would be handled by a gNB-CU in accordance with the CU-DU split. Other aspects of contention-based random access (CBRA) will be understood by persons skilled in the art.

Another type of random access procedure is contention-free random access (CFRA) (not shown). In CFRA (not shown), the network node 510 transmits an allocated random access preamble towards the UE 550. The UE 550 receives the allocated random access preamble and sends the random access preamble to the network node 510 in a random access request as MSG1. Then, MSG2 and MSG3 are similar to those described in connection with CBRA. No conflict resolution is needed in CFRA based on use of an allocated random access preamble. Other aspects of contention-free random access (CFRA) will be understood by persons skilled in the art.

When a UE moves from the coverage area of one cell to another cell, a serving cell change is performed at some point. A conventional serving cell change may be triggered by Layer 3 (L3) measurements (RRC measurement report from the UE) and is done by downlink RRC signaling (i.e., an RRC reconfiguration message with synchronization for change of primary cell (PCell) and primary secondary cell (PSCell), as well as release and add for secondary cells (Scell) when applicable. All cases involve complete L2 (and L1) resets, possibly leading to longer latency, larger overhead, and longer interruption time than beam switch mobility. By utilizing L1/L2 mobility enhancements to enable a serving cell change via L1/L2 signaling, latency, overhead and interruption time may be reduced.

Figure 6:
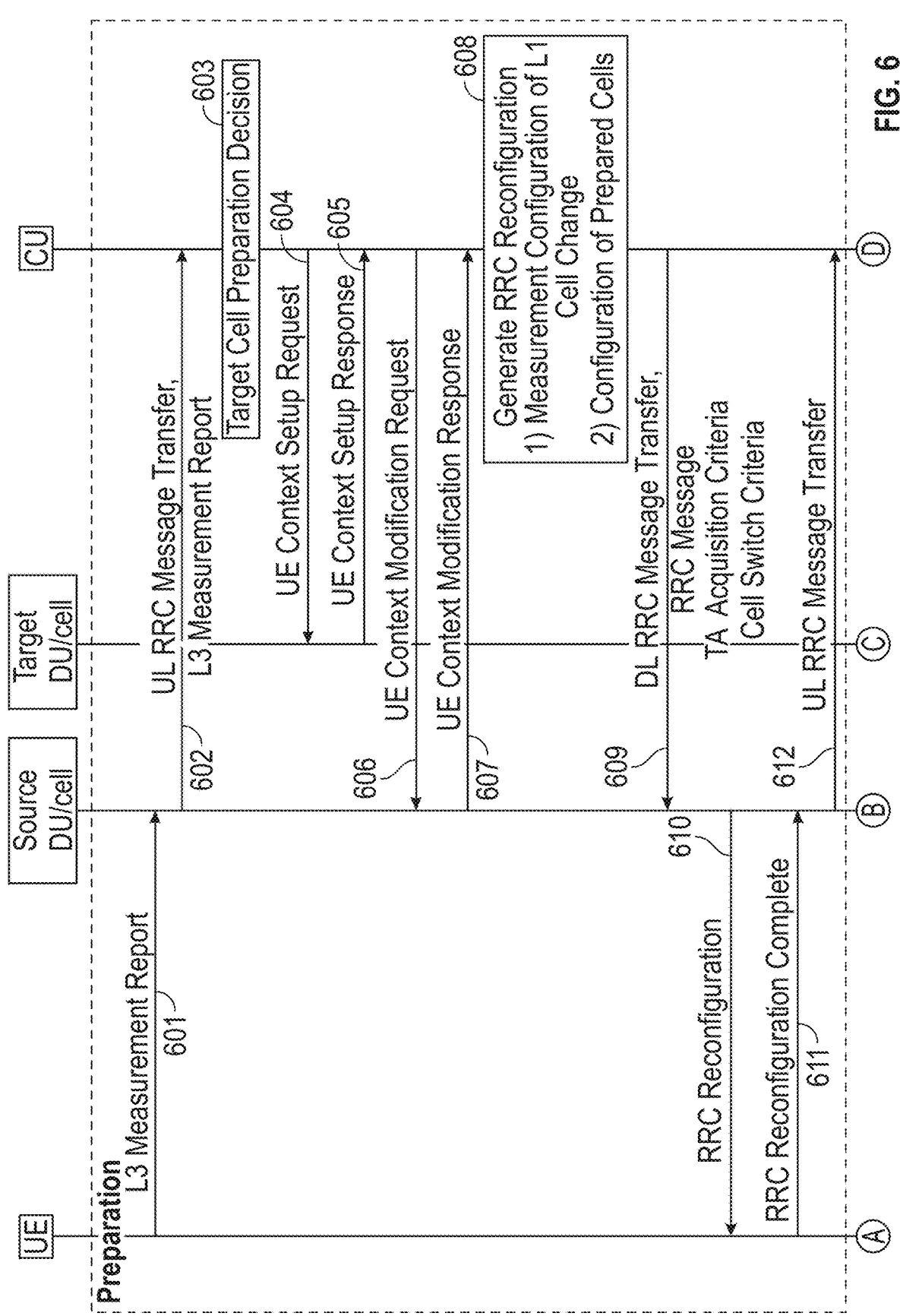
FIG. 6 is a diagram of an example embodiment of signals and operations among a UE, a central unit (CU), a source distributed unit (DU), and a target DU, relating to LTM, according to one illustrated aspect of the disclosure.

FIG. 6 is a diagram of an example embodiment 600 of signals and operations among a UE, a central unit (CU), a source distributed unit (DU), and a target DU, relating to LTM, according to one illustrated aspect of the disclosure. It is intended and shall be understood that other types of cell switch procedures (e.g., Layer 3 handover) are within the scope of the present disclosure. The following paragraphs will describe various signals and operations. It will be understood that a described signal may have associated operations and a described operation may have associated signals.

Referring now to FIG. 6, example signals and operations for LTM and random access procedure are shown in relation to an inter-DU cell switch procedure. The inter-DU scenario is illustrative, and aspects of the present disclosure may be applied to intra-DU scenarios, as well. Where the source DU and target DU are supported by different Cus, the source DU may be supported by a source CU and the target DU may be supported by a target CU, which can communicate via an Xn interface. As mentioned above, the terms "transmit towards", "receive from", and "cooperate with" (and their variations), include communications that may or may not involve communications through one or more intermediate devices or nodes. It is intended that any description referring to a DU shall also be treated as though the description refers to a network node which supports at least one of DU functionality or a layer 2 protocol of a radio access network (RAN). It is intended that any description referring to a CU shall also be treated as though the description refers to a network node which supports at least one of CU functionality or a layer 3 protocol of a radio access network (RAN).

The following paragraphs describe various signals and operations. It will be understood that the described signals may have associated operations and the described operations may have associated signals. Accordingly, a described signal may also be an operation and a described operation may also be a signal.

Prior to operation 601, the UE has established a connection with a DU (i.e., source DU) that supports the serving cell which serves the UE and has established a (logical) connection with the CU that supports the DU.

At operation 601, the UE transmits an L3 measurement report towards the source DU, and the source DU receives the L3 measurement report from the UE. Persons skilled in the art will understand an L3 measurement report, which may include averaged measurement samples of reference signals for a serving cell, for example. An L3 measurement report may indicate, for example, that a UE is nearing an edge of a cell and, thus, handover procedures should be initiated. At operation 602, the source DU forwards the L3 measurement report by transmitting the L3 measurement report towards the CU, and the CU receives the L3 measurement report from the source DU. At operation 603, the CU performs a handover (HO) decision/target cell preparation decision, based on the L3 measurement report, about whether a handover should be prepared. For the illustrated embodiment, the CU decides that a handover should be prepared.

At operation 604, the CU transmits a UE context setup request towards the target DU to prepare the target DU for handover by setting up the UE context in the target DU. The target DU receives the UE context setup request from the CU and sets up the UE context. At operation 605, the target DU provides an acknowledgement by transmitting a UE context setup response towards the CU, and the CU receives the UE context setup response from the target DU. Although one target DU is illustrated, there may be more than one target DU if there are multiple candidate cells. The operations at 604 and 605 may be used for each target DU and for multiple candidate cells. The description below will refer to candidate cell(s) to indicate there may be one candidate cell or multiple candidate cells and, where appropriate, will refer to target DU(s) supporting the candidate cell(s). If a target DU and the source DU are supported by different Cus, the Cus may communicate using an Xn interface. For convenience, only one CU is illustrated (a CU supporting the source DU), but it is intended for the disclosed technology to apply to multi-CU situations, as well.

At operation 606, the CU transmits a UE context modification request towards the source DU for modification of the UE context in the source DU, if needed, and for the provision of the target cell information (e.g., target cell RS configuration, activated or indicated TCI states, etc.). The source DU receives the UE context modification request from the CU, modifies the UE context (if needed), and receives the target cell information. At signal 607, the source DU provides an acknowledgment by transmitting a UE context modification response towards the CU, and the CU receives the UE context modification response from the source DU.

At operations 604-607, the CU, the target DU(s), and the source DU may coordinate with each other regarding timing advance acquisition and configuration for the candidate cell(s). Timing advance refers to information used by a UE to time its uplink transmissions towards a network node to arrive at the network node in alignment with a reception time window. This information may be referred to herein as a timing advance value or TA value, and the process of acquiring a timing advance value may be referred to herein as timing advance acquisition, TA acquisition, acquiring timing advance, or acquiring TA (or variations thereof). As described above, the term "acquire" (and its variations) includes acquiring in the first instance or reacquiring after the first instance. In embodiments, the source DU and the target DU(s) may coordinate (via the CU) on the method for the UE to acquire TA. In embodiments, a UE may acquire a separate TA value for each candidate cell.

In embodiments, TA may be acquired based on random access (RA) procedure (either CFRA or CBRA), such as, without limitation, a physical downlink control channel (PDCCH) ordered RA procedure, UE-triggered RA procedure, and/or a higher layer triggered RA procedure from a network node (other than a L3 handover command), among others. In embodiments, TA may be acquired based on non-RA procedure methods, such as, without limitation, sounding reference signal (SRS) based TA acquisition, receive timing difference based mechanisms (such as those in LTE), and/or UE-based TA measurement, among others. Such RA-based and non-RA-based methods for TA acquisition are within the scope of the present disclosure.

At operation 608, the CU creates an RRC reconfiguration message, which includes a measurement configuration for a L1 cell change, a configuration of prepared cells, and a TA acquisition configuration and trigger for the candidate cells. In embodiments, the RRC reconfiguration message may include TA configuration if CU involvement is needed later (in the execution phase). The TA configuration may, for example, specify the method for a UE to acquire TA. In embodiments, the TA acquisition method can be configured/ triggered based on L3 measurements by the CU (in coordination with the source-DU).

At signal 609, the CU transmits the RRC reconfiguration message towards the source DU using a downlink (DL) RRC message transfer, and the source DU receives the RRC reconfiguration message from the CU. As mentioned above, the RRC reconfiguration message may include the TA configuration and activated or indicated TCI state information mentioned above as well as cell switch criteria. At signal 610, the source DU transmits the RRC reconfiguration message towards the UE to forward it to the UE, and the UE receives the RRC reconfiguration message from the source DU. The UE performs a reconfiguration based on the RRC reconfiguration message. At operation 611, the UE responds by transmitting a RRC reconfiguration complete message towards the source DU using an uplink (UL) RRC message transfer, and the source DU receives the RRC reconfiguration complete message from the UE. At operation 612, the source DU transmits the RRC reconfiguration complete message towards the CU to forward it to the CU, and the CU receives the RRC reconfiguration complete message from the source DU. In embodiments, the signals 609-612 may be described as part of a logical connection between the UE and the CU, such that the CU transmits the RRC message towards the UE, and the UE receives the RRC message from the CU.

In embodiments, the signals and operations 601-612 described above may be referred to as a preparation phase. After the preparation phase is an execution phase.

In the execution phase, the UE, based on its configuration, provides periodic L1 measurement reports. Persons skilled in the art will understand L1 measurements. The L1 measurements may measure signal power of a list of reference signals configured by the network. For example, L1 measurements may measure signal power of reference signals corresponding to SSBs of activated TCI states. At operation 613, the UE periodically transmits the L1 measurement reports towards the source DU, and the source DU receives the periodic L1 measurement reports from the UE. In some cases, the reported measurements L1 reports may be L3 measurements.

At operation 614, the source DU decides, based on the received L1 measurement report, whether to trigger the UE to acquire TA for the set of candidate cells (i.e., candidate cells for the handover configured by the CU at operation 608).

At operation 615, the source DU transmits a TA acquisition command to the UE and the UE receives the TA acquisition command. The UE performs TA acquisition for the candidate cell(s) using the TA acquisition method specified in the RRC reconfiguration message of operation 608. As described above, TA may be acquired based on random access (RA) procedure (either CFRA or CBRA), such as, without limitation, a physical downlink control channel (PDCCH) ordered RA procedure, UE-triggered RA procedure, and/or a higher layer triggered RA procedure from a network node (other than a L3 handover command), among others. In embodiments, TA may be acquired based on non-RA procedure methods, such as, without limitation, sounding reference signal (SRS) based TA acquisition, receive timing difference based mechanisms (such as those in LTE), and/or UE-based TA measurement, among others. Such RA-based and non-RA-based methods for TA acquisition are within the scope of the present disclosure. After operation 615, the UE may have TA values for the candidate cell(s) before a cell switch is triggered if the TA acquisition procedure was successful. If the TA acquisition procedure was not successful, the UE would not have TA values for the candidate cell(s).

At operation 616, the UE transmits a random access preamble message to the target DU so that the target DU can estimate the TA between the UE and the target DU. Upon receipt of the random access preamble message by the target DU, at operation 617, the CU transmits a random access response message to the source DU and the source DU receives the random access response message to transmit to the UE, which receives the random access response message from the source DU.

At operation 618, the UE continues L1 measurement reporting and periodically transmits L1 measurement reports towards the source DU, and the source DU receives the periodic L1 measurement reports from the UE.

In embodiments, the signals and operations 613-618 may be referred to, collectively, as an execution phase. After the execution phase, in some example embodiments, several optional phases may be performed. A first option occurring subsequent to operation 618 may be performed at operations 619-624, while a second option occurring subsequent to operation 618 may be performed at operations 625-628.

For example, in a first optional phase operation 619 (option-1), a prior TCI activation occurs. For example, at operation 620, the source DU selects a potential target cell and its beam for a prior TCI state activation. At operation 621, the source DU transmits a TCI state activation command (TCI activation for LTM) to the UE and the UE receives the TCI activation for LTM command.

At operation 622, the UE tracks the associated QCL RS and acquires downlink time/frequency synchronization. At operation 623, the source DU determines the target cell for which to handover the UE. After the determination, at operation 624, the source DU transmits a MAC CE trigger cell change message that includes the TA of the target cell and the TCI state indication to the UE and the UE receives the MAC CE trigger cell change message.

In a second optional phase operation 625 (option-2), simultaneous TCI activation and indication occurs. For example, at operation 626, the source DU determines the target cell and beam for which to handover the UE. After the determination, at operation 627, the source DU transmits a MAC CE trigger cell change message that includes the TA of the target cell, the TCI state activation, and the TCI state indication to the UE and the UE receives the MAC CE trigger cell change message. At operation 628, the UE tracks the associated QCL RS and acquires downlink time/frequency synchronization.

Upon the completion of either option-1 (i.e., operations 619-624) or option-2 (i.e., operations 625-628), the UE performs random access procedures at operation 629, which would be understood by persons skilled in the art.

At operation 630, to initiate communication with the target DU, the UE transmits an RRC reconfiguration complete message towards the target DU using already config-ured uplink (UL) resources, and the target DU receives the RRC reconfiguration complete message from the UE. At operation 631, The target DU forwards the RRC reconfigu-ration complete message using a UL RRC message transfer to transmit the RRC reconfiguration complete message towards the CU, and the CU receives the RRC reconfigu-ration complete message from the target DU. At operation 632, the CU transmits a UE context release command/request towards the source DU to release the UE context from the source DU, and the source DU receives the UE context release command/request from the CU. The source DU releases the UE context in response to the UE context release command/request. At operation 633, the source DU transmits a UE context release complete message towards the CU, and the CU receives the UE context release com-plete message from the source DU. The CU may then perform a path switch to the target DU as the new DU supporting the serving cell.

The signals and operations of FIG. 6 are merely illustra-tive, and variations are contemplated to be within the scope of the present disclosure. For example, the signals and operations may assume one TA value per physical cell ID (PCI). In embodiments, to cover multi-TRP (multi-transmit receipt point) scenarios, the UE may be configured and required to acquire multiple Tas for a PCI, such as, for example, different TA values for different sets of TCI-states. In embodiments, the signals and operations may include others not illustrated in FIG. 6. In embodiments, the signals and operations may not include every signal and operation illustrated in FIG. 6. In embodiments, the signals and operations may be implemented in a different order than that illustrated in FIG. 6. Such and other embodiments are contemplated to be within the scope of the present disclo-sure.

In some examples, switching TCI states from one active TCI state to add another TCI state may incur a delay. For example, FIG. 7 is a diagram of an example TCI state switching delay for a TCI state addition on an active TCI state list.

Figure 7:
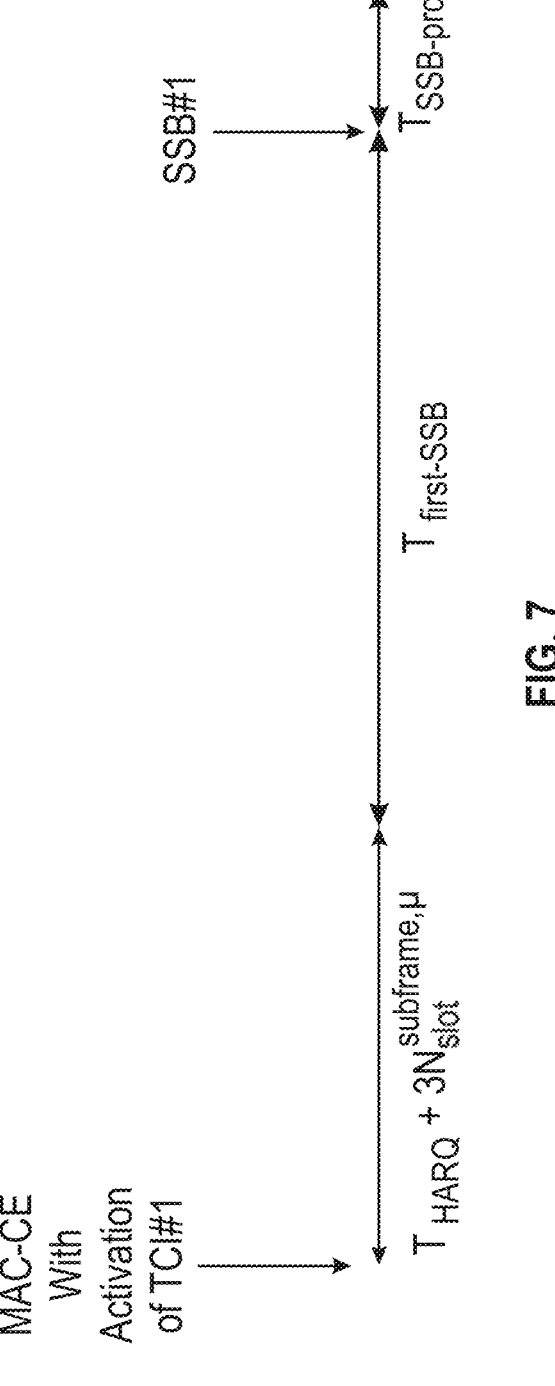
FIG. 7 is a diagram of an example transmission configuration (TCI) state switching delay for a TCI state addition on an active TCI state list.

As shown in FIG. 7, the delay may depend on whether the target TCI state is already on the active TCI state list or not. If the target TCI state is not on the active TCI state list, the UE is required to synchronize with a corresponding SSB, which is why the delay involves $T_{first\text{-}SSB}$ and $T_{SSB\text{-}proc}$, which are the time until the first SSB transmission after the MAC CE command with the SSB with QCL-TypeA or QCL-TypeC to the target TCI state and the SSB processing delay. The SSB periodicity may be different in different configurations (e.g., 160 ms.). Therefore, the first SSB with the correct QCL-relation to the target TCI state may occur up to 160 ms after the UE has decoded the MAC CE command. When the target TCI state is already on the active TCI state list, synchronization with the first SSB is not needed, and the delay is significantly shorter. This is illus-trated in FIG. 7, where the $T_{first\text{-}SSB}$ and $T_{SSB\text{-}proc}$ may be omitted in the delay if the target TCI state is already on the active TCI state list.

Accordingly, to reduce the above delay, in the case of LTM, a beam indication (TCI state) associated with the target cell could be provided as a part of the cell switch command which the UE would use to communicate with the target cell. In order to provide the TCI state indication, early activation of such TCI state may be done for the UE to acquire time/frequency synchronization early (while con-nected with the source cell) which can reduce handover interruption. In various embodiments, early activation of such TCI state may be done for the UE to start acquiring time/frequency synchronization after receiving cell switch command, or after connecting to the new target cell. In one example, connecting to the new target cell may mean that the UE has transmitted an RRC message to the target cell (e.g., RRC reconfiguration complete). This may reduce handover interruption or increase the throughput when entering the new cell (i.e., the UE can be scheduled with higher order modulations/or using higher gain beams, etc.). Each candi-date target cell may be prepared with a set of TCI states, given in the LTM configuration given outside of the current serving cell or cells configuration.

Since one of the current serving cells (such as a SCell, secondary cell) may also be selected as a candidate target cell (e.g., as a target PCell) for cell switching for which a TCI state may already be activated based on its serving cell configuration, a TCI state activation for cell switch using the LTM configuration for a current active serving cell may incur unnecessary activation latency (and/or activation sig-naling) and it may be desirable to minimize the activation latency and signaling overhead in such scenarios. Further, a UE may include information on both TCI states from an intra-cell activation pool as well as the TCI states of the LTM TCI state pool. In some example embodiments, the TCI states of the intra-cell pool may be considered "first TCI states" of a "first TCI state pool" while the TCI states of the LTM TCI state pool may be considered "second TCI states" of a "second TCI state pool". The TCI state pools are thus inherently different configurations (e.g., may be separately configured) and may comprise independently configured (same or different) sets of TCI states. A TCI state pool may refer to a list of TCI states that can be activated for beam indication (these are activated TCI states) for at least one of the activated TCI states. The pool or list of TCI states may be configured using RRC signaling. The list of TCI states (pool of TCI States) may be a list of joint DL/UL TCI states (i.e., used for both uplink and downlink communication). The list of TCI states (pool of TCI States) may be a list of separate DL or UL TCI states. An intra-cell activation pool may refer to a list of TCI states that may be activated for the beam indication for intra-cell communication (e.g., for beam management). An LTM TCI state pool may refer to a list of TCI states that may activated for beam indication for the LTM cell switch (e.g., for beam indication prior to cell switch or beam indication in the cell switch command or beam indication after the cell switch command). For a pool of TCI states, if only one TCI state (a single TCI state) is activated, it is also an indicated TCI state. In some cases, if a TCI state is indicated without activation, the indicated TCI state may also be changed to an activated TCI state.

Figure 8:
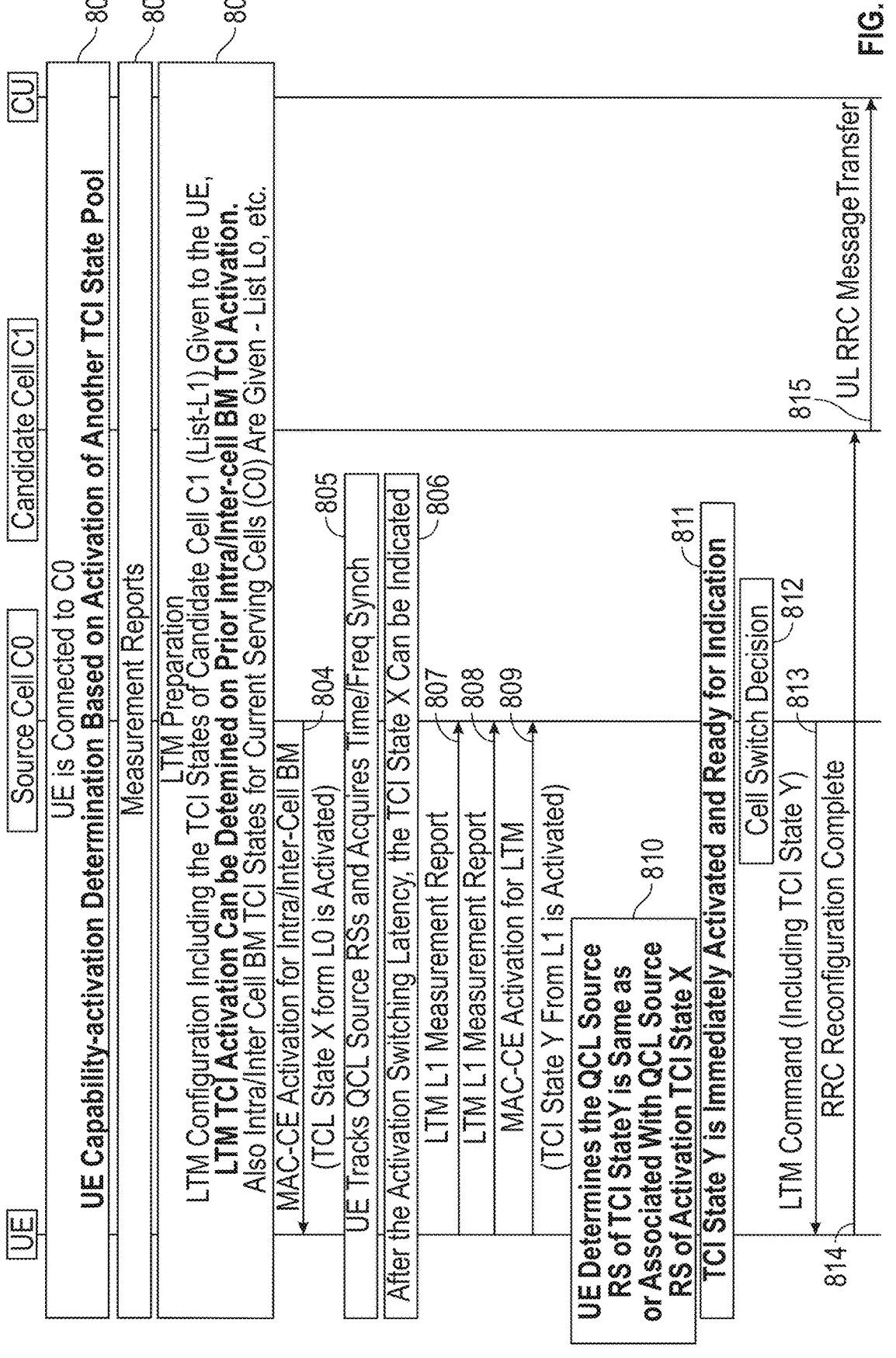
FIG. 8 is a diagram of an example embodiment of signals and operations in an LTM TCI activation procedure among a UE, a CU, a source cell, and a candidate cell, according to one illustrated aspect of the disclosure.

FIG. 8 is a diagram of an example embodiment of signals and operations 800 in an LTM TCI activation procedure among a UE, a CU, a source cell, and a candidate cell, according to one illustrated aspect of the disclosure.

The following paragraphs will describe various signals and operations. It will be understood that a described signal may have associated operations and a described operation may have associated signals. Accordingly, a described signal may also involve an operation and a described operation may also involve a signal. Further, in some example embodiments the term source cell and candidate cell may be used interchangeably with the terms "source DU" and "candidate DU". Also, as used herein, PDCCH may refer to the physical downlink control channel, PDSCH may refer to the physical downlink shared channel, PUSCH may refer to the physical uplink shared channel, PUCCH may refer to the physical uplink control channel, DMRS may refer to demodulation reference signals, and TRS may refer to the tracking reference signal.

At operation 801, the UE establishes a connection with a source cell C0 (e.g., source DU that supports the serving cell which serves the UE and has established a (logical) connection with the CU that supports the DU). The UE includes the capability to determine a TCI activation associated with a TCI state pool based on the already activated TCI state associated with a different TCI state pool. The network may be aware of this capability as a part of UE capability indication. In some example embodiments, the UE may indicate its capability to support of activation of a TCI state of one TCI state pool based on the already activated TCI state, or states, of another TCI state pool.

At operation 802, measurement reports are shared between the UE, source cell C0, candidate cell C1 and the CU. In some example embodiments, the sharing may include operations similar to operations 601 (L3 measurement report message) and 602 (UL RRC message transfer) described above in FIG. 6.

Accordingly, based on the measurement reports (e.g., L3 measurement reports), at operation 803, the LTM preparation is performed by the CU, and the LTM configuration including the TCI states of candidate cells are provided to the UE. As described above, the UE also includes TCI states configured under the current serving cell configurations for intra/inter-cell beam management (BM). This may be referred as a BM TCI pool. The UE is also configured that for BM TCI activation, activation is allowed/configured/ enable based on already activated TCI states of another TCI state pool, e.g., the LTM TCI state pool). Alternatively, or additionally, the UE is configured that for LTM TCI activation, activation is allowed/configured/enable based on already activated TCI states of another TCI state pool, e.g., the BM TCI state pool).

Different types of configuration options (e.g., based on TA acquisition status, L1 measurement quality, or set of candidate cells for which this is allowed is indicated) may be utilized.

For example, the UE may be configured (e.g., in RRC) whether a TCI state activation from one TCI state pool of configured TCI states could be based on the already activated TCI state(s) of another TCI state pool. For example, for LTM, in the LTM preparation phase described below, the UE may be configured in an RRC (reconfiguration) message whether TCI activation for a LTM candidate cell could be based on the already activated TCI state(s) of another TCI state pool (configured for intra/inter-cell BM of the current serving cells).

In various embodiments, the UE may be configured for which LTM candidate cells the UE may determine the activation of one or more TCI states based on the activated TCI state of another TCI state pool (e.g. cell specific or cell set specific TCI state pool).

In various embodiments, the MAC-CE activation command may contain an indication, common to all included TCI states or a separate indication for each included TCI state in the MAC-CE whether the activation of one or more TCI State of one TCI state pool can be used to activate one or more TCI state of another TCI state pool. For example, the MAC-CE activation command may contain an indication that the activation of one or more TCI State of LTM TCI state pool can be used to activate one or more TCI state of intra/inter-cell BM TCI state pool. Or vice versa: the MAC-CE activation command may contain an indication that the activation of one or more TCI State of the intra/inter-cell BM TCI state pool can be used to activate one or more TCI state of the LTM TCI state pool.

In various embodiments, the message providing the cell switch command (e.g. MAC-CE) may comprise an indication whether the UE can consider activation of TCI states of one TCI state pool based on the TCI state activation of another TCI pool.

In various embodiments, in the case of simultaneous activation and indication via the cell switch command, the MAC-CE cell switch command may contain an indication, common to all included TCI states or a separate indication for each included TCI state of one TCI state pool in the MAC-CE whether the activation could be based on the activated TCI state of another TCI state pool.

In various embodiments, the UE may be configured to consider the activation based on the prior activation of another TCI state pool for candidate cells or downlink RSs for which the TA is available or TA acquisition procedure has been performed. TA acquisition procedure may also include at least sending a PRACH transmission to the candidate cell based on the PDCCH order from the network.

In various embodiments, the UE may be configured to consider the activation (of one or more TCI states of one TCI state pool) based on the (prior) activation of another TCI state pool for candidate cells or downlink RSs based on L1 measurements. As an example, the DL RS for L1 measurement may be configured as DL RS in the TCI state (i.e. the TCI state includes/comprises the DL RS which is also a DL RS for L1 measurement). As an example, for DL RS, for which the L1 measurement is above a certain quality (a configured threshold) or for which the L1 measurements after the last activation (associated with first TCI state pool) has not been changed by more than a certain threshold value. As an example, the threshold value may be expressed in dBs (e.g. 3 dB, 6 dB and so on). The threshold value may be configured by network (e.g. via RRC signaling). In one example, the L1 measurement may need to be a reported measurement (e.g. reported at least once) to be considered for activation.

In various embodiments, the configuration can be configured per TCI State (in RRC signaling) in the TCI state pool or set of TCI states in the TCI state pool (e.g., via RRC signaling) whether the activation is applied.

In some example embodiments, the source cell may indicate in handover related signaling to the target cell which TCI states/QCL sources are considered to be activated from the UE perspective.

In some example embodiments, the source cell may indicate in handover related signaling to the target cell whether TCI states/QCL sources of one TCI state pool are considered to be activated based on the activation of another TCI state pool from the UE perspective.

At operation 804, the source cell transmits a MAC-CE activation for intra/inter-cell BM message to the UE and the UE receives the MAC-CE activation message for intra/inter-cell BM (i.e. activation of TCI states for intra cell/serving cell beam management). The MAC-CE activation for intra/inter-cell BM message includes that the TCI state from one of the serving cells TCI state pool is activated (e.g., TCI state x from L0). Accordingly, at operation 805, the UE tracks the QCL source RSs (included in the TCI State) and acquires the time/frequency synchronization. Once acquired, at operation 806, after the activation switching latency, the TCI state (e.g., TCI state x) can be used (or can be used for beam indication).

At operations 807-808, the UE continues L1 measurement reporting and periodically transmits L1 measurement reports towards the source cell, and the source cell receives the periodic L1 measurement reports from the UE.

Based upon the received L1 measurements, at operation 809, the source cell may decide to activate a TCI state (e.g., TCI state y) associated with a candidate cell (e.g., candidate cell C1). TCI state y may be selected from the LTM TCI state list of the LTM TCI state pool given for candidate cell C1. The source cell transmits a MAC-CE activation for LTM command to the UE and the UE receives the MAC-CE activation for LTM command. The MAC-CE command may indicate to the UE to activate TCI state y.

Accordingly, upon receiving the MAC-CE activation for one or more TCI states of LTM TCI state pool from the serving cell (source cell) cell, the UE may determine that at least one of the QCL source RSs of TCI state y (e.g., a second TCI state) is also a QCL source RS of TCI state x (e.g., a first TCI state) which is already activated although belonging to a different TCI state pool, namely the intra/inter-cell BM TCI state pool. That is, a QCL reference signal of the first TCI state may be considered related/associated/to share a common property with a QCL reference signals of the second TCI state when they are the same.

In one embodiment, upon receiving the MAC-CE activation for one or more (second) TCI states of the LTM TCI state pool from the serving cell (source cell) cell, the UE may determine whether at least one of the LTM TCI states share the same property with (or more generally are related to) one or more (first) TCI states of the intra cell TCI state pool). If the UE determines that they share the same property, e.g. the same QCL source RS, the UE may determine that the one or more (second) TCI states are already active. The activation of the one or more second TCI states may be performed upon determination whether the TCI states (first and second) share the same property (i.e. upon receiving the activation message for the second TCI states). In some examples, the activation (and determination whether the TCI states share the at least one same property) may be performed upon connecting to the target cell. In one example, the activation may be performed (and determining the properties) may be performed upon receiving the cell switch command for the target cell associated with the one or more first TCI states.

That is, a QCL reference signal of the first TCI state may be considered related/associated/to share a common property with a QCL reference signal of the second TCI state when they define the same or identical (signal).

In various embodiments, if a first and second TCI state (of first and second pools) share the common property, the TCI state activation delay may be reduced because the above-described synchronization delay(s) may be reduced or even eliminated. In one example, the first TCI state may be activated which may cause the UE to determine that a second TCI state to be activated if they share at least one common property/are related. In one example, the first TCI state may be activated in a first message (e.g. activation MAC CE associated with the first TCI state) and the second TCI state is activated in a second message (e.g., activation MAC CE associated with second TCI state). Receiving the second message may cause the UE to determine that the second TCI state is activated without activation delay or reduced activation delay if the first and second TCI state share at least one common property/are related. An activated (second) TCI may be further assumed as a known TCI state/being in an active TCI state list for beam indication after the cell switch has been performed to the cell associated with the second TCI state. The known TCI state/being in an active TCI state list may refer to the at least UE being able to receive downlink channels (PDSCH/PDCCH) with reduced delay. There may be one or more first TCI states, and one or more second TCI states. The first TCI states may refer to intra-cell/serving cell beam management TCI states. The second TCI states may refer to LTM TCI states. In other words the activation of the first TCI state may be used to determine activation of the second TCI state upon receiving an activation message for the first TCI state (the first and second TCI states may have activation delay of X milliseconds/slots). Alternatively, activation of the first TCI state may be used to determine activation of the second TCI state upon receiving a second activation message for the second TCI state (where the activation of the first TCI state has been provided in a first message) causing the UE not to apply activation/switching delay (of e.g. X milliseconds/slots) or apply reduced activation/switching delay. Similarly, the first TCI State may be determined to be activated based on the second TCI state as described herein.

In some examples, if a TCI state (or states) is known (based on activation) it may assumed to be ready for reception and/or transmission of at least downlink or uplink channels without considering (additional) delay components based on DL RS measurements associated with the TCI state (e.g., SSB). In one example, this is illustrated in FIG. 7, where the $T_{first\text{-}SSB}$ and $T_{SSB\text{-}proc}$ may be omitted in the delay if the target TCI state is already on the active TCI state list.

In various embodiments, a QCL reference signal of the first TCI state may be considered related/associated/sharing a common property with a QCL reference signal of the second TCI state when they share same one or more of QCL properties (e.g., one or more of doppler spread, doppler shift, delay spread, or average delay).

In various embodiments, a QCL reference signal of the first TCI state may be considered related/associated with a QCL reference signal of the second TCI state when they are QCLed with type D (spatial domain relation, e.g., same beam). For example, a QCL reference for the first TCI state may be a TRS, and a QCL reference signal associated with the second TCI state is SSB where the TRS and SSB are QCLed with QCL type D. In other words, if the first TCI state has been activated and second TCI states share the same QCL source RS (e.g. SSB), the second TCI state is also considered to be activated.

In various embodiments, if the QCL source RS of the first TCI state (TCI state may comprise of TRS-CSI-RS) and the second TCI state share the same QCL source (SSB or CSI-RS), all TCI states having the target RS (such as one or more TCI comprising TRS and having the same source RS) are considered as activated TCI states in all TCI state pools or at least in multiple TCI state pools.

In various embodiments, if the QCL source RS of the first TCI state (TCI state may comprise of TRS-CSI-RS or SSB) and QCL source RS of the second TCI state (TCI state may comprise of TRS-CSI-RS or SSB) are the same signal, the UE may determine that TCI states share the same property. The same property may refer to the same QCL source RS (SSB or CSI-RS).

In various embodiments, if the QCL source of the QCL source RS of the first TCI state (QCL source of the QCL source RS may be, e.g., SSB) and QCL source of the QCL source RS of the second TCI state (QCL source of the QCL source RS may be, e.g., SSB) are the same signal, the UE may determine that TCI states share the same property/are related. The same property may refer to the QCL source of the QCL source RS (SSB or CSI-RS). In other words a TCI state may include QCL source RS (e.g. TRS-CSI-RS) that has a further QCL source RS such as SSB (the main QCL source). As an example of the QCL relationship (or QCL chain) may be PDCCH DMRS→TRS-CSI-RS→SSB. The QCL source RS of a TCI State may be a source RS for a target signal such as PDCCH/PDSCH/PUSCH/PUCCH DMRS.

At operation 811, the UE and source cell assume TCI state y as activated and ready for indication. At operation 812, the source cell makes a cell switch decision to candidate cell C1 with TCI state y. Once the decision is made, the source cell, at operation 813 transmits an LTM switching command with TCI state indication containing TCI state y to the UE and the UE receives the LTM switching command with TCI state indication containing TCI state y. If there was no prior TCI activation for TCI state y for LTM, simultaneous activation and indication may be performed as described above.

At operation 814, to initiate communication with the candidate cell, the UE transmits an RRC reconfiguration complete message towards the target cell using already configured uplink (UL) resources, and the candidate cell receives the RRC reconfiguration complete message from the UE. At operation 815, The candidate cell forwards the RRC reconfiguration complete message using a UL RRC message transfer to transmit the RRC reconfiguration complete message towards the CU, and the CU receives the RRC reconfiguration complete message from the candidate cell. The CU may then perform a path switch to the candidate cell as the serving cell.

The signals and operations of FIG. 8 are merely illustrative, and variations are contemplated to be within the scope of the present disclosure. In embodiments, the signals and operations may include others not illustrated in FIG. 8. In embodiments, the signals and operations may not include every signal and operation illustrated in FIG. 8. In embodiments, the signals and operations may be implemented in a different order than that illustrated in FIG. 8. Such and other embodiments are contemplated to be within the scope of the present disclosure.

Figure 9:
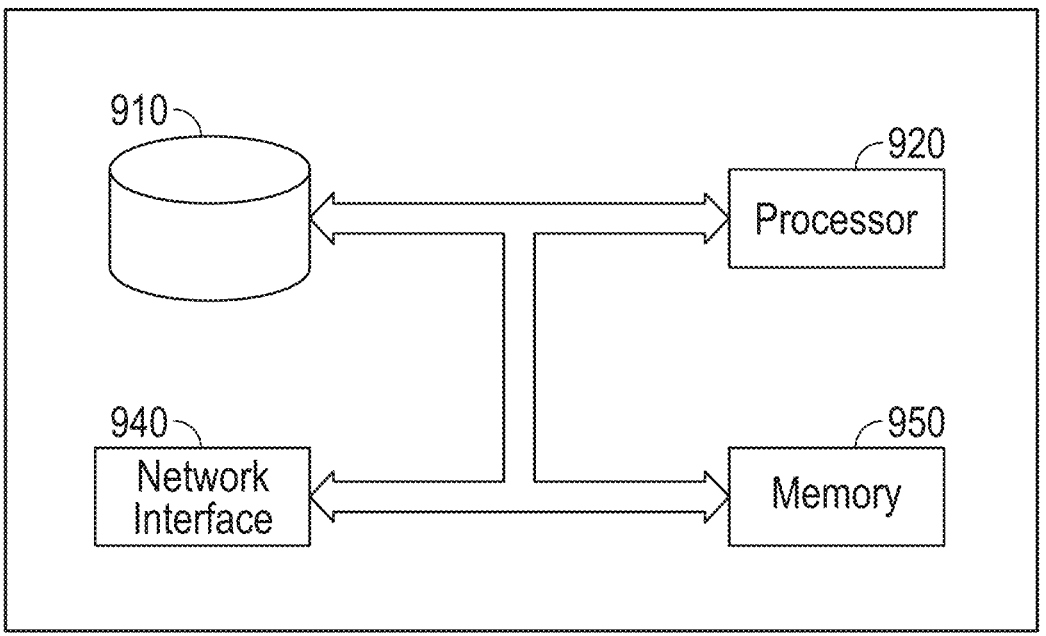
FIG. 9 is a diagram of example embodiment of components of a UE or of a network apparatus, according to one illustrated aspect of the present disclosure.

Referring now to FIG. 9, there is shown a block diagram of example components of a UE or a network apparatus. The apparatus includes an electronic storage 910, a processor 920, a memory 950, and a network interface 940. The various components may be communicatively coupled with each other. The processor 920 may be and may include any type of processor, such as a single-core central processing unit (CPU), a multi-core CPU, a microprocessor, a digital signal processor (DSP), a System-on-Chip (SoC), or any other type of processor. The memory 950 may be a volatile type of memory, e.g., RAM, or a non-volatile type of memory, e.g., NAND flash memory. The memory 950 includes processor-readable instructions that are executable by the processor 920 to cause the apparatus to perform various operations, including those mentioned herein, such as the operations of FIGS. 6 and 8, for example.

The electronic storage 910 may be and include any type of electronic storage used for storing data, such as hard disk drive, solid state drive, and/or optical disc, among other types of electronic storage. The electronic storage 910 stores processor-readable instructions for causing the apparatus to perform its operations and stores data associated with such operations, such as storing data relating to 5G NR standards, among other data. The network interface 240 may implement wireless networking technologies such as 5G NR and/or other wireless networking technologies.

The components shown in FIG. 9 are merely examples, and persons skilled in the art will understand that an apparatus includes other components not illustrated and may include multiples of any of the illustrated components. Such and other embodiments are contemplated to be within the scope of the present disclosure.

Further embodiments of the present disclosure include the following examples.

Example 1.1. A method, comprising:

receiving, by a user equipment (UE) connected to a first cell, an activation for a first transmission configuration indicator (TCI) state of a first TCI state pool for a second cell and a second TCI state of the second TCI state pool for the second cell;

determining, by the UE, that a quasi-colocation (QCL) reference signal of the first activated TCI state shares one or more properties with the QCL reference signal of the second TCI state;

based upon the determining, activating, by the UE, the second TCI state of the second cell; and performing, by the UE, a cell switch to the second cell, using the activated second TCI state of the second cell.

Example 1.2. The method of example 1.1, wherein the UE maintains the activated second TCI state of the second cell upon switching to the second cell.

Example 1.3. The method of example 1.1, wherein the activation of the second TCI state of the second cell is determined after switching to the second cell.

Example 1.4. The method as in any of examples 1.1-1.3, wherein the first activated TCI state of the first TCI state pool is associated with a beam management configuration for the second cell and the second TCI state of the second TCI state pool is associated with a lower-layer triggered mobility (LTM) configuration for the second cell.

Example 1.5. The method as in any of examples 1.1-1.3, wherein the first activated TCI state of the first TCI state pool is associated with a lower-layer triggered mobility (LTM) configuration for the second cell and the second TCI state of the second TCI state pool is associated with a beam management configuration for the second cell.

Example 1.6. The method as in any of examples 1.1-1.5, wherein the second cell is configured as an LTM candidate cell.

Example 1.7. The method of example 1.6, wherein the second cell is configured as a serving cell.

Example 1.8. The method as in any of examples 1.1-1.7, wherein the determination of the first activated TCI state and the second TCI sharing one or more properties includes determining that a quasi-colocation (QCL) reference signal of the first activated TCI state is equivalent to the QCL reference signal of the second TCI state.

Example 1.9. The method as in any of examples 1.1-1.7, wherein the determination of the first activated TCI state and the second TCI sharing one or more properties includes determining that a quasi-colocation (QCL) reference signal of the first activated TCI state shares one or more properties with the QCL reference signal of the second TCI state.

Example 1.10. The method of example 1.9, wherein the one or more QCL properties include one or more of the following: doppler spread, doppler shift, delay spread, or average delay.

Example 1.11. The method of example 1.9, wherein the QCL reference signal of the first activated TCI state sharing one or more properties with the QCL reference signal of the second TCI state includes the QCL reference signal of the first activated TCI state including a same QCL source reference signal (RS).

Example 1.12. A method as in any of examples 1.1-1.11, wherein the activation for the first TCI state of the first TCI state pool associated with a second cell and the second TCI state of the second TCI state pool associated with the second cell is included in a media access control (MAC) control element (CE) message.

Example 2.1. A user equipment (UE), comprising:
means for receiving, by the UE connected to a first cell, an activation for a first transmission configuration indicator (TCI) state of a first TCI state pool associated with a second cell and a second TCI state of a second TCI state pool associated with the second cell;
means for determining, by the UE, that the first activated TCI state and the second TCI state share one or more properties;
means for, based upon the determining, activating, by the UE, the second TCI state of the second cell; and
means for performing, by the UE, a cell switch to the second cell, using the activated second TCI state of the second cell.

Example 2.2. The UE of example 2.1, wherein the UE includes means for maintaining the activated second TCI state of the second cell upon switching to the second cell.

Example 2.3. The UE of example 2.1, wherein the activation of the second TCI state of the second cell is determined after switching to the second cell.

Example 2.4. The UE as in any of examples 2.1-2.3, wherein the first activated TCI state of the first TCI state pool is associated with a beam management configuration for the second cell and the second TCI state of the second TCI state pool is associated with a lower-layer triggered mobility (LTM) configuration for the second cell.

Example 2.5. The UE as in any of examples 2.1-2.3, wherein the first activated TCI state of the first TCI state pool is associated with a lower-layer triggered mobility (LTM) configuration for the second cell and the second TCI state of the second TCI state pool is associated with a beam management configuration for the second cell.

Example 2.6. The UE as in any of examples 2.1-2.5, wherein the second cell is configured as an LTM candidate cell.

Example 2.7. The UE of example 2.6, wherein the second cell is configured as a serving cell.

Example 2.8. The UE as in any of example 2.1-2.7, wherein the determination of the first activated TCI state and the second TCI sharing one or more properties includes determining that a quasi-colocation (QCL) reference signal of the first activated TCI state is equivalent to the QCL reference signal of the second TCI state.

Example 2.9. The UE as in any of examples 2.1-2.7, wherein the determination of the first activated TCI state and the second TCI sharing one or more properties includes determining that a quasi-colocation (QCL) reference signal of the first activated TCI state shares one or more properties with the QCL reference signal of the second TCI state.

Example 2.10. The UE of example 2.9, wherein the one or more QCL properties include one or more of the following: doppler spread, doppler shift, delay spread, or average delay.

Example 2.11. The UE of example 2.9, wherein the QCL reference signal of the first activated TCI state sharing one or more properties with the QCL reference signal of the second TCI state includes the QCL reference signal of the first activated TCI state including a same QCL source reference signal (RS).

Example 2.12. The UE as in any of examples 2.1-2.11, wherein the activation for the first TCI state of the first TCI state pool associated with a second cell and the second TCI state of the second TCI state pool associated with the second cell is included in a media access control (MAC) control element (CE) message.

Example 3.1. An apparatus, comprising:
means for transmitting, by a first cell, a first message to a user equipment (UE) that includes at least a first activated transmission configuration indicator (TCI) state of a first TCI state pool associated with a second cell and a second TCI state of a second TCI state pool associated with the second cell, based upon the first activated TCI state and the second TCI state sharing one or more properties;
means for performing, by the first cell, beam management using the first TCI state; and
means for transmitting, by the first cell, to a user equipment, an instruction for a lower-layer triggered mobility (LTM) cell switch to the second cell, the instruction comprising the second TCI state for the second cell.

Example 3.2. The apparatus of example 3.1, wherein the instruction for the LTM cell switch includes a command for LTM cell switch to the second cell.

Example 3.3. The apparatus of example 3.1, wherein a determination of the first activated TCI state and the second TCI state sharing one or more properties includes determining that a quasi-colocation (QCL) reference signal of the first activated TCI state is equivalent to the QCL reference signal of the second TCI state.

Example 3.4. The apparatus of example 3.1, wherein a determination of the first activated TCI state and the second TCI sharing one or more properties includes determining that a quasi-colocation (QCL) reference signal of the first activated TCI state shares one or more properties with the QCL reference signal of the second TCI state.

Example 3.5. The apparatus of example 3.4, wherein the one or more QCL properties include one or more of the following: doppler spread, doppler shift, delay spread, or average delay.

Example 3.6 The apparatus of example 3.4, wherein the QCL reference signal of the first activated TCI state sharing one or more properties with the QCL reference signal of the second TCI state includes the QCL reference signal of the first activated TCI state including a same QCL source reference signal (RS).

Example 3.7. The apparatus as in any of examples 3.1-3.6, wherein the first activated TCI state of the first TCI state pool is associated with a lower-layer triggered mobility (LTM) configuration for the second cell and the second TCI state of the second TCI state pool is associated with a beam management configuration for the second cell.

Example 3.8. The apparatus as in any of examples 3.1-3.7, wherein the second cell is configured as an LTM candidate cell.

Example 3.9 The apparatus as in any of examples 3.1-3.8, wherein the second cell is configured as a serving cell.

Example 3.10 The apparatus as in any of examples 3.1-3.9, wherein the first message is a media access control (MAC) control element (CE) message.

The embodiments and aspects disclosed herein are examples of the present disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

For example, described above is a scenario when a UE receives a TCI activation command containing a activation of one or more of first TCI state index associated with a first configured TCI state pool, the one or more second TCI states associated with second TCI pool may be considered activated after the determination that at least one QCL source reference signal of the second TCI state of second pool is associated with QCL reference signal(s) of the one or more first activated TCI state of the first TCI state pool.

In some example embodiments, the first TCI state pool may be a TCI state pool associated with one of the current serving cells, and the second TCI state pool may be a TCI state pool configured for an LTM candidate cell.

In some example embodiments, a first TCI state pool may be a TCI state pool configured for an LTM candidate cell, and a second configured TCI state pool may be a TCI state pool associated with one of the current serving cells.

In some example embodiments, if the UE is configured with one or more TCI state pools for serving cells and with another TCI state pool for LTM, when a TCI state is activated for an LTM candidate cell, if the target TCI state is on the active TCI state list belonging to any of the configured TCI state pools, synchronization with the SSB with the QCL-relationship to the target TCI state may not be considered in the TCI state activation or LTM cell switch delay.

The phrases "in an aspect," "in aspects," "in various aspects," "in some aspects," or "in other aspects" may each refer to one or more of the same or different aspects in accordance with this present disclosure. The phrase "a plurality of" may refer to two or more.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, Python, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

While aspects of the present disclosure have been shown in the drawings, it is not intended that the present disclosure be limited thereto, as it is intended that the present disclosure be as broad in scope as the art will allow and that the specification be read likewise. Therefore, the above description should not be construed as limiting, but merely as exemplifications of particular aspects. Those skilled in the art will envision other modifications within the scope and spirit of the claims appended hereto.

What is claimed is:

1. A method, comprising:

receiving, by a user equipment (UE) connected to a first cell, an activation for a first transmission configuration indicator (TCI) state of a first configured TCI state pool configured under serving cell configurations for beam management (BM);

receiving, by the UE, a configuration of a second TCI state of a second TCI state pool associated with a lower-layer triggered mobility (LTM) candidate cell;

receiving, by the UE, a message for activating the second TCI state;

determining, by the UE, that the second TCI state is already active on any of the configured TCI state pools;

based upon the determining, activating, by the UE, the second TCI state of the second TCI state pool with a reduced activation delay compared with a situation where the second TCI state is not active on any of the configured TCI state pools; and performing, by the UE, a cell switch to the LTM candidate cell, and maintaining the activated second TCI state of the LTM candidate cell.

2. The method of claim 1, wherein the reduced activation delay is realized by not considering, as a delay in the activation of the second TCI state, synchronization with a synchronization signal block that has a quasi-co-location relationship to the second TCI state.

3. The method of claim 2, wherein the reduced activation delay is based on omitting synchronization with the synchronization signal block.

4. The method of claim 3, wherein the reduced activation delay is based on that parameters $T_{first\text{-}SSB}$ and $T_{SSB\text{-}proc}$ are omitted in the activation delay.

5. The method of claim 1, wherein the second TCI state is determined to be already active on the first TCI state pool.

6. The method of claim 5, wherein the activating the second TCI state of the second TCI sate pool with the reduced delay is based on the second TCI state being already active on the first TCI state pool.

7. The method of claim 1, wherein the UE activates the second TCI state after receiving the activation for the first TCI state and before the cell switch and maintains the activated second TCI state of the second cell upon switching to the second cell.

8. The method of claim 1, wherein the activation of the second TCI state of the second cell is determined after switching to the second cell.

9. The method of claim 1, wherein the second cell is configured as a serving cell.

10. The method of claim 1, wherein a quasi-colocation (QCL) reference signal of the first activated TCI state is equivalent to the QCL reference signal of the second TCI state.

11. A user equipment (UE), comprising:
at least one processor; and
at least one memory storing instructions which, when executed by the at least one processor, cause the UE at least to perform at least the following:
receiving, by the UE connected to a first cell, an activation for a first transmission configuration indicator (TCI) state of a first configured TCI state pool configured under serving cell configurations for beam management (BM);
receiving, by the UE, a configuration of a second TCI state of a second TCI state pool associated with a lower-layer triggered mobility (LTM) candidate cell;
receiving, by the UE, a message for activating the second TCI state;
determining, by the UE, that the second TCI state is already active on any of the configured TCI state pools;
based upon the determining, activating, by the UE, the second TCI state of the second TCI state pool with a reduced activation delay compared with a situation where the second TCI state is not active on any of the configured TCI state pools; and
performing, by the UE, a cell switch to the LTM candidate cell, and maintaining the activated second TCI state of the LTM candidate cell.

12. The UE of claim 11, wherein the instructions, when executed by the at least one processor, cause the UE at least to realize the reduced activation delay by not considering, as a delay in the activation of the second TCI state, synchronization with a synchronization signal block that has a quasi-co-location relationship to the second TCI state.

13. The UE of claim 12, wherein the reduced activation delay is based on omitting synchronization with the synchronization signal block.

14. The UE of claim 13, wherein the reduced activation delay is based on that parameters $T_{first\text{-}SSB}$ and $T_{SSB\text{-}proc}$ are omitted in the activation delay.

15. The UE of claim 11, wherein the second TCI state is determined to be already active on the first TCI state pool.

16. The method of claim 15, wherein the activating the second TCI state of the second TCI sate pool with the reduced delay is based on the second TCI state being already active on the first TCI state pool.

17. The UE of claim 11, wherein the instructions, when executed by the at least one processor, cause the UE to activate the second TCI state after receiving the activation for the first TCI state and before the cell switch and maintains the activated second TCI state of the second cell upon switching to the second cell.

18. The UE of claim 11, wherein the activation of the second TCI state of the second cell is determined after switching to the second cell.

19. The UE of claim 11, wherein a quasi-colocation (QCL) reference signal of the first activated TCI state is equivalent to the QCL reference signal of the second TCI state.

20. A non-transitory processor-readable medium storing instructions which, when executed by at least one processor of a User Equipment (UE), causes the UE at least to perform a method comprising:
receiving, by the UE connected to a first cell, an activation for a first transmission configuration indicator (TCI) state of a first configured TCI state pool configured under serving cell configurations for beam management (BM);
receiving, by the UE, a configuration of a second TCI state of a second TCI state pool associated with a lower-layer triggered mobility (LTM) candidate cell;
receiving, by the UE, a message for activating the second TCI state;
determining, by the UE, that the second TCI state is already active on any of the configured TCI state pools;
based upon the determining, activating, by the UE, the second TCI state of the second TCI state pool with a reduced activation delay compared with a situation where the second TCI state is not active on any of the configured TCI state pools; and
performing, by the UE, a cell switch to the LTM candidate cell, and maintaining the activated second TCI state of the LTM candidate cell.

* * * * *